US012476424B2

(12) United States Patent
Oh et al.

(10) Patent No.: US 12,476,424 B2
(45) Date of Patent: Nov. 18, 2025

(54) BOARD CONNECTOR

(71) Applicant: LS MTRON LTD., Anyang-si (KR)

(72) Inventors: Sang Jun Oh, Anyang-si (KR); Dong Wan Kim, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 359 days.

(21) Appl. No.: 18/018,833

(22) PCT Filed: Jul. 16, 2021

(86) PCT No.: PCT/KR2021/009172
§ 371 (c)(1),
(2) Date: Jan. 30, 2023

(87) PCT Pub. No.: WO2022/035070
PCT Pub. Date: Feb. 17, 2022

(65) Prior Publication Data
US 2024/0039215 A1 Feb. 1, 2024

(30) Foreign Application Priority Data
Aug. 13, 2020 (KR) ........................ 10-2020-0101497
Jul. 9, 2021 (KR) ........................ 10-2021-0090212

(51) Int. Cl.
*H01R 13/6585* (2011.01)
*H01R 12/71* (2011.01)
(Continued)

(52) U.S. Cl.
CPC ....... *H01R 13/6585* (2013.01); *H01R 12/716* (2013.01); *H01R 13/6471* (2013.01); *H01R 24/50* (2013.01)

(58) Field of Classification Search
CPC .............. H01R 13/6585; H01R 12/716; H01R 13/6471; H01R 24/50; H01R 13/6588; H01R 13/6594; H01R 13/6597
See application file for complete search history.

(56) References Cited

U.S. PATENT DOCUMENTS 6,045,389 A * 4/2000 Ferrill .............. H01R 13/65915 439/404
6,093,046 A * 7/2000 Chiou ................ H01R 13/6589 439/378
(Continued)

FOREIGN PATENT DOCUMENTS

JP 2011060650 A 3/2011
JP 2018110087 A 7/2018
(Continued)

OTHER PUBLICATIONS

International Search Report for related International Application No. PCT/KR2021/009172; action dated Feb. 17, 2022; (5 pages).
(Continued)

*Primary Examiner* — Truc T Nguyen
(74) *Attorney, Agent, or Firm* — K&L Gates LLP

(57) ABSTRACT

The present disclosure relates to a board connector comprising a plurality of radio frequency (RF) contacts for transmitting RF signals; an insulation unit for supporting the RF contacts; a plurality of transmission contacts coupled to the insulation unit between a plurality of first RF contacts and a plurality of second RF contacts among the RF contacts so that the first RF contacts and the second RF contacts are spaced apart from each other along a first axial direction; a ground housing having the insulation unit coupled thereto; a first ground contact coupled to the insulation unit and shielding the first RF contacts from the transmission contacts, with reference to the first axial direction; and a second ground contact coupled to the insulation unit and shielding the second RF contacts from the transmission contacts, with reference to the first axial direction.

20 Claims, 15 Drawing Sheets

(51) Int. Cl.
*H01R 13/6471* (2011.01)
*H01R 24/50* (2011.01)

(56) References Cited

U.S. PATENT DOCUMENTS

| | | | | |
|---|---|---|---|---|
| 11,677,176 | B2 * | 6/2023 | Oosaka | H01R 13/631 439/752.5 |
| 2003/0124879 | A1 * | 7/2003 | Ng | H01R 12/714 439/66 |
| 2003/0129864 | A1 * | 7/2003 | Peloza | H01R 12/7005 439/79 |
| 2009/0061655 | A1 * | 3/2009 | Miyazaki | H01R 13/20 439/74 |
| 2013/0237090 | A1 * | 9/2013 | Chang | H01R 13/6586 439/607.01 |
| 2018/0151967 | A1 | 5/2018 | Chen et al. | |
| 2020/0244011 | A1 | 7/2020 | Kitazawa | |
| 2021/0265790 | A1 * | 8/2021 | Nakagawa | H01R 13/40 |
| 2021/0305753 | A1 * | 9/2021 | Wang | H01R 13/646 |
| 2021/0359437 | A1 * | 11/2021 | Oosaka | H01R 12/57 |
| 2022/0140534 | A1 * | 5/2022 | Hoshiba | H01R 13/6461 439/74 |
| 2022/0360023 | A1 * | 11/2022 | Kim | H01R 12/73 |
| 2022/0368046 | A1 * | 11/2022 | Oosaka | H01R 13/6587 |
| 2023/0104947 | A1 * | 4/2023 | Oh | H01R 12/73 439/74 |
| 2023/0411911 | A1 * | 12/2023 | Kim | H01R 12/716 |

FOREIGN PATENT DOCUMENTS

| | | | |
|---|---|---|---|
| KR | 20150062111 | A | 6/2015 |
| KR | 20160082442 | A | 7/2016 |
| KR | 20160089126 | A | 7/2016 |
| KR | 20160089216 | A | 7/2016 |
| WO | 03065512 | A1 | 8/2003 |
| WO | 2020039666 | A1 | 2/2020 |

OTHER PUBLICATIONS

Written Opinion for related International Application No. PCT/KR2021/009172; action dated Feb. 17, 2022; (3 pages)

Notice of Allowance for related Korean Patent Application No. 10-2021-0090212; action dated Feb. 20, 2024; (7 pages).

Notice of Allowance for related Japanese Application No. 2023-506356; action dated Jan. 30, 2024; (3 pages).

* cited by examiner

BOARD CONNECTOR

CROSS-REFERENCE TO RELATED APPLICATION

The present application is a National Stage of International Application No. PCT/KR2021/009172 filed on Jul. 16, 2021, which claims priority to and the benefit of Korean Utility Model Application No. 10-2020-0101497, filed on Aug. 13, 2020; and Korean Utility Model Application No. 10-2021-0090212, filed Jul. 9, 2021 the disclosures of which are incorporated herein by reference in their entirety.

FIELD

The present disclosure relates to a board connector installed in an electronic device to electrically connect boards.

BACKGROUND

Connectors are provided in various electronic devices for electrical connection. For example, connectors may be installed in electronic devices such as mobile phones, computers, or tablet computers to electrically connect various parts installed in the electronic devices to each other.

In general, among electronic devices, radio frequency (RF) connectors and board-to-board connectors (hereinafter referred to as "board connectors") are provided inside a wireless communication device such as a smart phone or a tablet personnel computer (PC). An RF connector transmits an RF signal. A board connector processes digital signals of cameras or the like.

RF connectors and board connectors are mounted on a printed circuit board (PCB). Conventionally, since a plurality of connectors and a plurality of RF connectors are mounted in a limited PCB space with a plurality of other components, there is a problem in that a PCB mounting area is increased. Therefore, in accordance with the trend of miniaturization of smartphones, there is a need for technology for integrating RF connectors and board connectors to optimize a small PCB mounting area.

FIG. 1 is a schematic perspective view of a board connector according to a related art.

Referring to FIG. 1, a board connector 100 according to the related art includes a first connector 110 and a second connector 120.

The first connector 110 is to be coupled to a first board (not shown). The first connector 110 may be electrically connected to the second connector 120 through a plurality of first contacts 111.

The second connector 120 is to be coupled to a second board (not shown). The second connector 120 may be electrically connected to the first connector 110 through a plurality of second contacts 121.

In the board connector 100 according to the related art, the first contacts 111 and the second contacts 121 may be connected to each other to electrically connect the first board and the second board to each other. In addition, when some of the first contacts 111 and the second contacts 121 are used as RF contacts for RF signal transmission, the circuit board connector 100 according to the related art may be implemented such that RF signals are transmitted between the first board and the second board through the RF contacts.

Here, the board connector 100 according to the related art has the following problems.

First, in the board connector 100 according to the related art, when contacts at relatively close intervals are used as the RF contacts among the contacts 111 and 121, there is a problem in that signal transmission is not performed smoothly due to RF signal interference between RF contacts 111', 111", 121', and 121".

Second, in the board connector 100 according to the related art, since an RF signal shielding part 112 is provided at an outermost side of the connector, although radiation of RF signals to the outside can be shielded, there is a problem in that shielding between RF signals is not achieved.

Third, in the board connector 100 according to the related art, the RF contacts 111', 111", 121', and 121' include mounting portions **111*a*', 111*a*", 121*a*", and 121*a*" mounted on the board, respectively, and the mounting portions 111*a*', 111*a*", 121*a*", and 121*a*" are disposed to be exposed to the outside. Accordingly, the board connector 100 according to the related art has a problem in that the portions 111*a*', 111*a*", 121*a*", and 121*a*"** are not shielded.

SUMMARY

Therefore, the present disclosure is designed to solve these problems by providing a board connector capable of reducing a possibility of radio frequency (RF) signal interference between RF contacts.

Technical Solution

To solve the above problems, the present disclosure may include the following configurations.

A board connector according to the present disclosure includes a plurality of radio frequency (RF) contacts configured to transmit RF signals, an insulating part configured to support the RF contacts, a plurality of transmission contacts coupled to the insulating part between a plurality of first RF contacts among the RF contacts and a plurality of second RF contacts among the RF contacts such that the first RF contacts and the second RF contacts are spaced apart from each other in a first axial direction, a ground housing to which the insulating part is coupled, a first ground contact coupled to the insulating part and configured to shield the first RF contacts from the transmission contacts in the first axial direction, and a second ground contact coupled to the insulating part and configured to shield the second RF contacts from the transmission contacts in the first axial direction. A 1-1 RF contact among the first RF contacts and a 1-2 RF contact among the first RF contacts may be spaced apart from each other in a second axial direction perpendicular to the first axial direction. The first ground contact may include a 1-1 ground contact which not only shields the 1-1 RF contact from the transmission contacts in the first axial direction but also shields the 1-1 RF contact from the 1-2 RF contact in the second axial direction.

A board connector according to the present disclosure includes a plurality of RF contacts configured to transmit RF signals, an insulating part configured to support the RF contacts, a plurality of transmission contacts coupled to the insulating part between a plurality of first RF contacts among the RF contacts and a plurality of second RF contacts among the RF contacts such that the first RF contacts and the second RF contacts are spaced apart from each other in a first axial direction, a ground housing to which the insulating part is coupled, a first ground contact coupled to the insulating part and configured to shield the first RF contacts from the transmission contacts in the first axial direction, and a second ground contact coupled to the insulating part and configured to shield the second RF contacts from the transmission contacts in the first axial direction. A 1-1 RF contact among the first RF contacts and a 1-2 RF contact among the first RF contacts may be spaced apart from each other in a second axial direction perpendicular to the first axial direction. The first ground contact may include a 1-1 ground contact which not only shields the 1-1 RF contact from the transmission contacts in the first axial direction but also shields the 1-1 RF contact from the 1-2 RF contact through the connection of the ground contact of the counterpart connector in the second axial direction. The 1-1 ground contact may include a 1-1 connection arm which is connected to a ground contact of a counterpart connector to be elastically moved.

According to the present disclosure, the following effects can be achieved.

According to the present disclosure, a function of shielding radio frequency (RF) contacts from signals, electromagnetic waves, and the like can be implemented using a ground housing and a ground contact. Accordingly, according to the present disclosure, it is possible to prevent electromagnetic waves generated from RF contacts from interfering with signals of circuit components positioned around an electronic device and prevent electromagnetic waves generated from the circuit components positioned around the electronic device from interfering with RF signals transmitted by the RF contacts. Accordingly, the present disclosure can contribute to improving electromagnetic interference (EMI) shielding performance and electromagnetic compatibility (EMC) performance using a ground housing and a ground contact.

According to the present disclosure, all RF contacts including portions mounted on a board may be implemented to be positioned inside a ground housing. Therefore, according to the present disclosure, a shielding function for RF contacts is strengthened using the ground housing, thereby implementing complete shielding.

DETAILED DESCRIPTION

Figure 8:
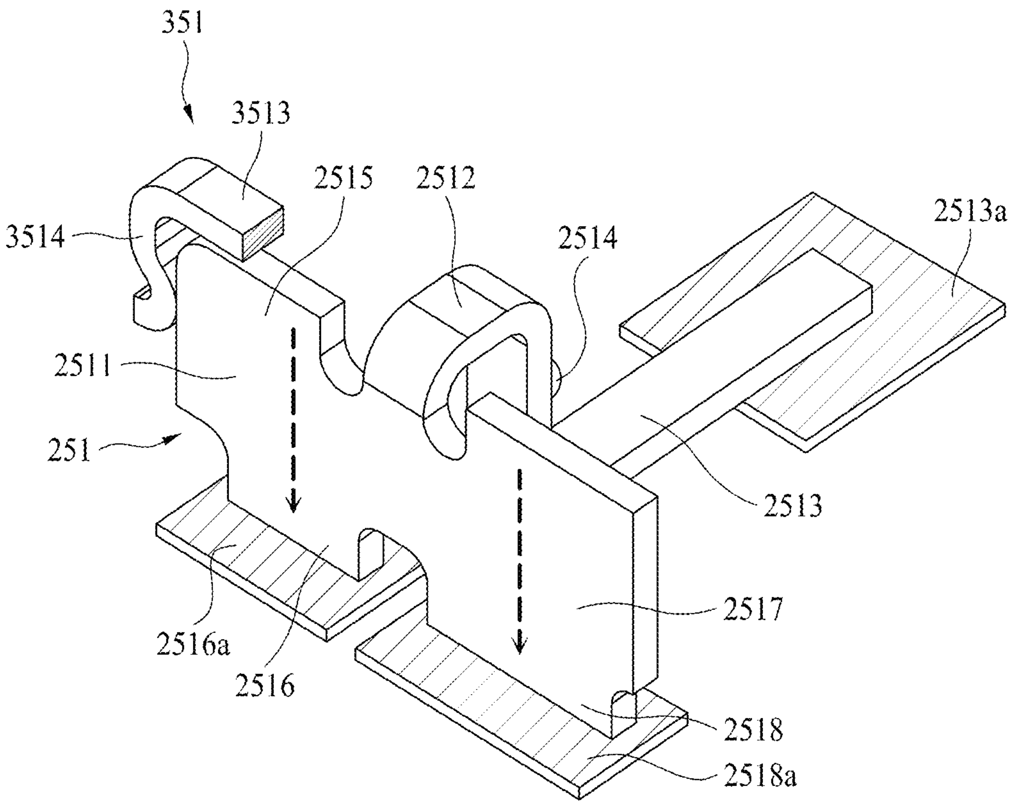
FIG. 8 is a schematic perspective view illustrating a state in which a 1-1 ground contact is mounted on a board in the board connector according to the first embodiment.
Figure 9:
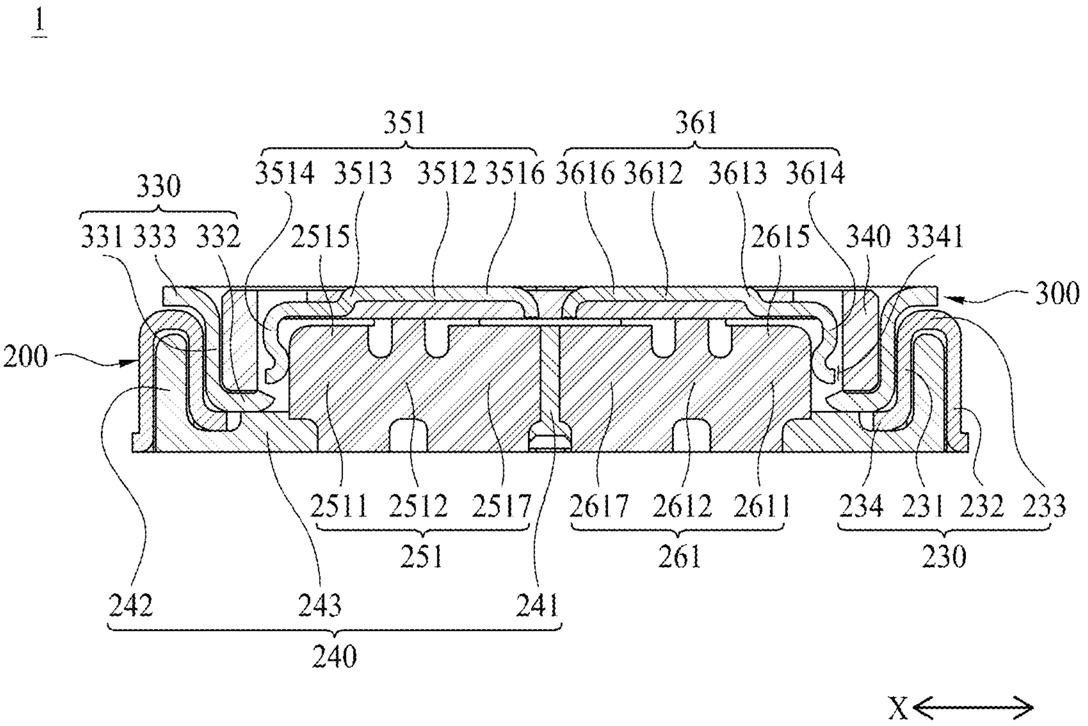
FIG. 9 is a schematic side cross-sectional view along line I-I of FIG. 7 which illustrates a state in which the board connector according to the first embodiment and a board connector according to a second embodiment are coupled.

Hereinafter, embodiments of a board connector according to the present disclosure will be described in detail with reference to the accompanying drawings. FIG. 9 shows a state in which a board connector according to a second embodiment is reversed from a direction shown in FIGS. 2 and 10 and then coupled a board connector according to a first embodiment. FIG. 8 shows a state in which a portion of a 1-1 ground contact of the board connector according to the second embodiment is omitted.

Figure 1:
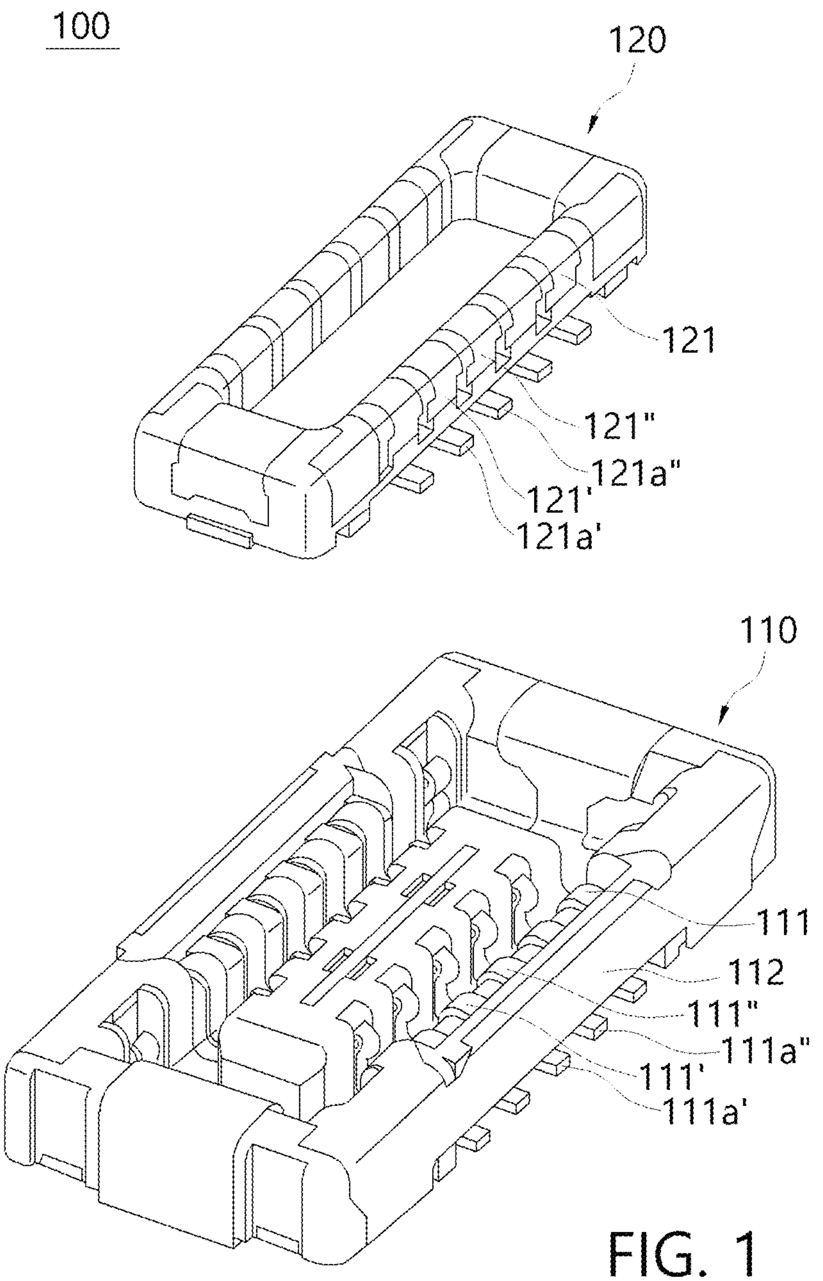
FIG. 1 is a schematic perspective view of a board connector according to a related art.
Figure 2:
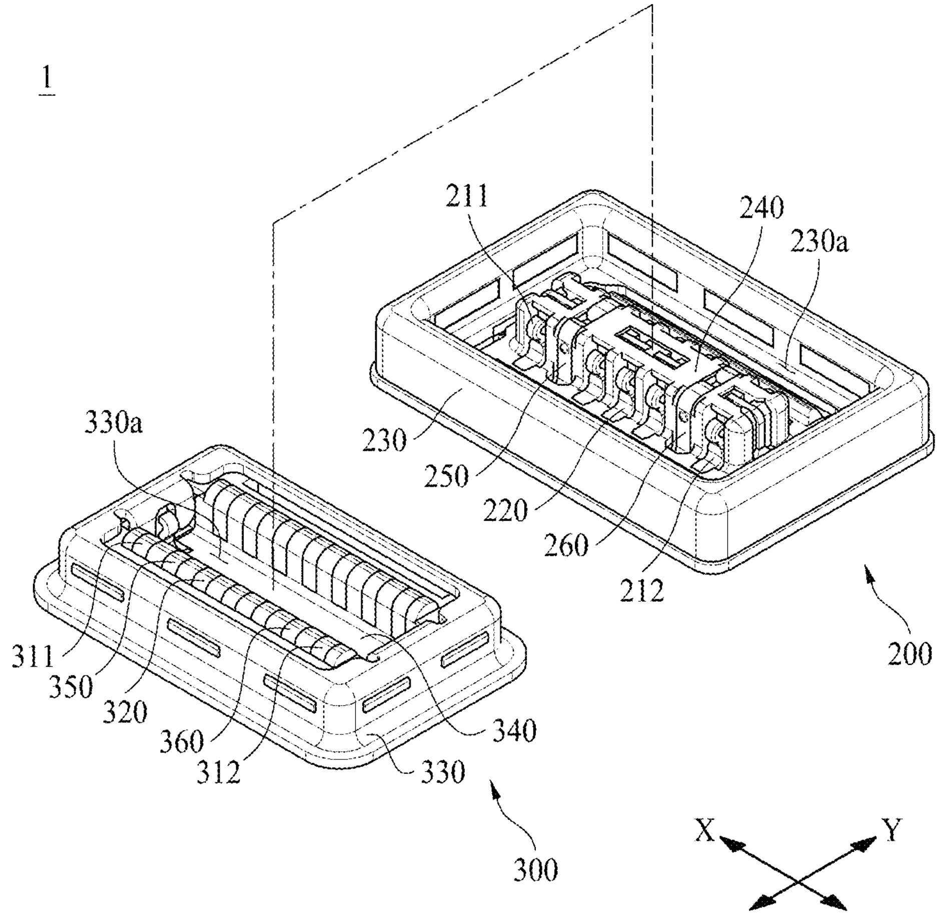
FIG. 2 is a schematic perspective view of a receptacle connector and a plug connector in a board connector according to the present disclosure.

Referring to FIG. 2, a board connector 1 according to the present disclosure may be installed in an electronic device (not shown) such as a mobile phone, a computer, or a tablet computer. The board connector 1 according to the present disclosure may be used to electrically connect a plurality of boards (not shown). The boards may be printed circuit boards (PCBs). For example, when a first board and a second board are electrically connected, a receptacle connector mounted on the first board may be connected to a plug connector mounted on the second board. Accordingly, the first board and the second board may be electrically connected to each other through the receptacle connector and the plug connector. The plug connector mounted on the first board and the receptacle connector mounted on the second board may be connected to each other.

The board connector 1 according to the present disclosure may be implemented as the receptacle connector. The board connector 1 according to the present disclosure may be implemented as the plug connector. The board connector 1 according to the present disclosure may be implemented to include both the receptacle connector and the plug connector. Hereinafter, detailed description thereof will be provided with reference to the accompanying drawings with an embodiment in which the board connector 1 according to the present disclosure is implemented as the receptacle connector defined as a board connector 200 according to a first embodiment, and an embodiment in which the board connector 1 according to the present disclosure is implemented as the plug connector defined as a board connector 300 according to a second embodiment. In addition, description will be provided based on an embodiment in which the board connector 200 according to the first embodiment is mounted on the first board and the board connector 300 according to the second embodiment is mounted on the second board. Thus, it will be apparent to those skilled in the art how to derive an embodiment in which the board connector 1 according to the present disclosure includes both the receptacle connector and the plug connector.

Board Connector 200 According to First Embodiment

Figure 3:
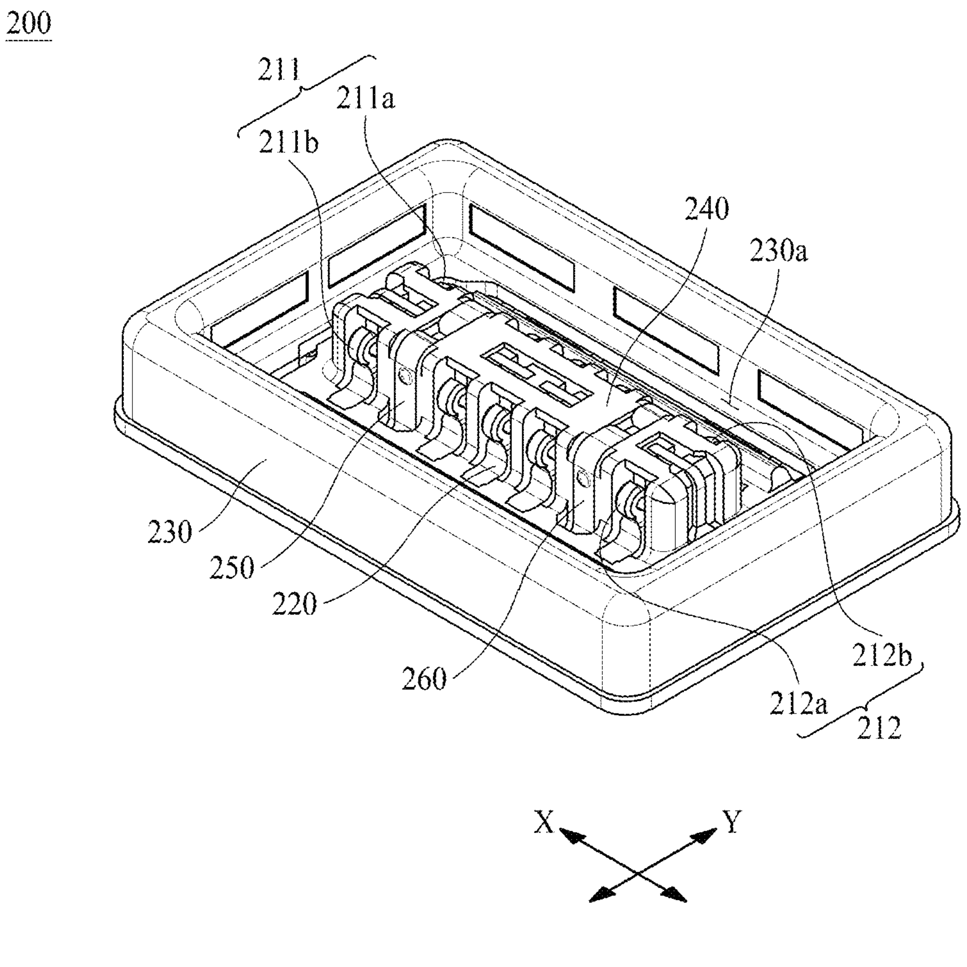
FIG. 3 is a schematic perspective view of a board connector according to a first embodiment.
Figure 4:
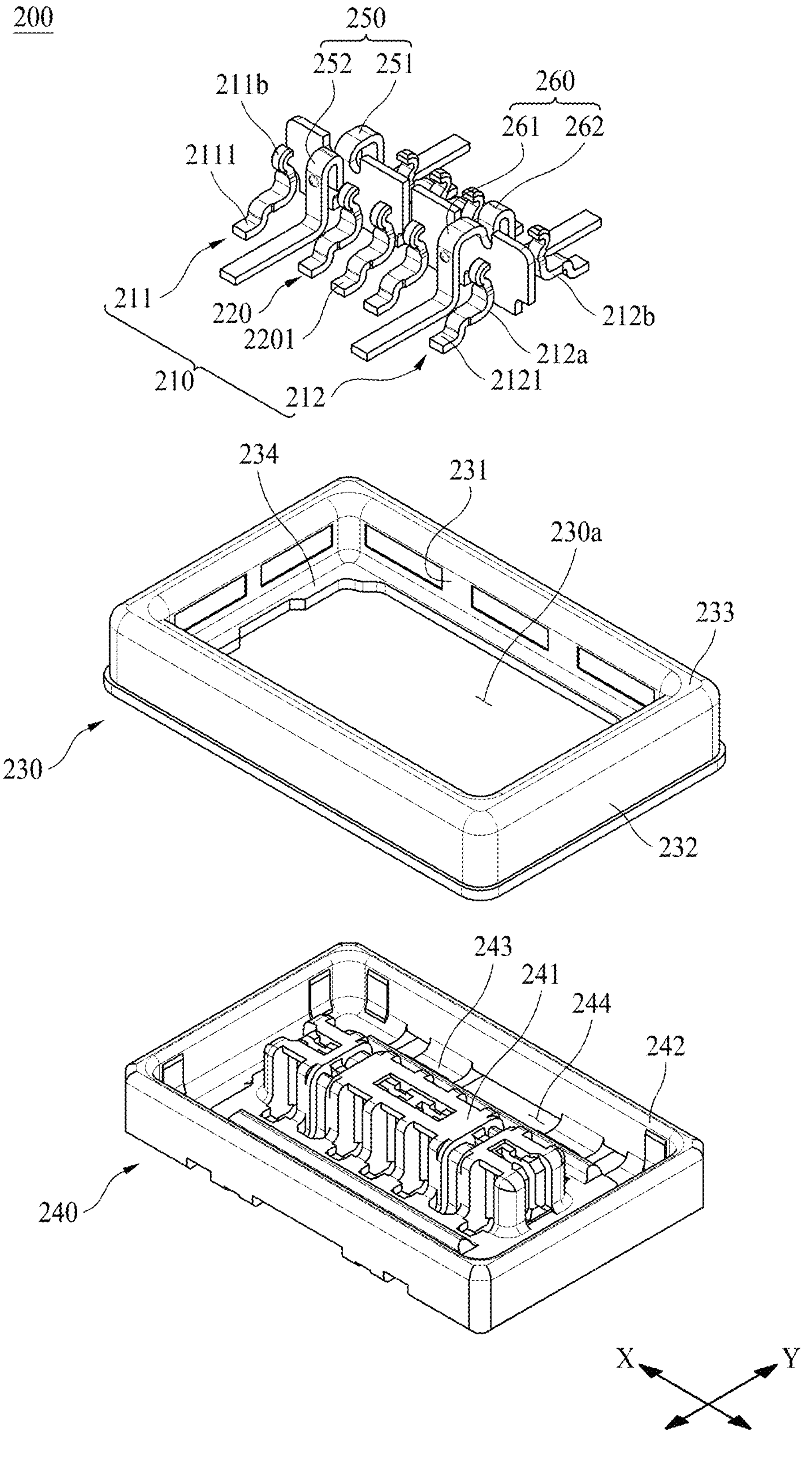
FIG. 4 is a schematic exploded perspective view of the board connector according to the first embodiment.

Referring to FIGS. 2 to 4, the board connector 200 according to the first embodiment may include a plurality of radio frequency (RF) contacts 210, a plurality of transmission contacts 220, a ground housing 230, and an insulating part 240.

The RF contacts 210 are for transmitting RF signals. The RF contacts 210 may transmit an ultrahigh frequency RF signal. The RF contacts 210 may be supported by the insulating part 240. The RF contacts 210 may be coupled to the insulating part 240 through an assembly process. The RF contacts 210 may be molded integrally with the insulating part 240 through injection molding.

The RF contacts 210 may be spaced apart from each other. The RF contacts 210 may be mounted on the first board to be electrically connected to the first board. The RF contacts 210 may be connected to RF contacts of a counterpart connector to be electrically connected to the second board on which the counterpart connector is mounted. Accordingly, the first board and the second board may be electrically connected. When the board connector 200 according to the first embodiment is a receptacle connector, the counterpart connector may be a plug connector. When the board connector 200 according to the first embodiment is a plug connector, the counterpart connector may be a receptacle connector.

A first RF contact 211 among the RF contacts 210 and a second RF contact 212 among the RF contacts 210 may be spaced apart from each other in a first axial direction (X-axis direction). The first RF contact 211 and the second RF contact 212 may be supported by the insulating part 240 at positions spaced apart from each other in the first axial direction (X-axis direction).

The first RF contact 211 may include a first RF mounting member 2111. The first RF mounting member 2111 may be mounted on the first board. Accordingly, the first RF contact 211 may be electrically connected to the first board through the first RF mounting member 2111. The first RF contact 211 may be formed of a material having electrical conductivity. For example, the first RF contact 211 may be formed of a metal. The first RF contact 211 may be connected to any one of the RF contacts of the counterpart connector.

The second RF contact 212 may include a second RF mounting member 2121.

The second RF mounting member 2121 may be mounted on the first board. Accordingly, the second RF contact 212 may be electrically connected to the first board through the second RF mounting member 2121. The second RF contact 212 may be formed of a material having electrical conductivity. For example, the second RF contact 212 may be formed of a metal. The second RF contact 212 may be connected to any one of the RF contacts of the counterpart connector.

Referring to FIGS. 2 to 5, the transmission contacts 220 are coupled to the insulating part 240. The transmission contacts 220 may perform a function of transmitting a signal, data, power, or the like. The transmission contacts 220 may be coupled to the insulating part 240 through an assembly process. The transmission contacts 220 may be molded integrally with the insulating part 240 through injection molding.

The transmission contacts 220 may be disposed between the first RF contact 211 and the second RF contact 212 in the first axial direction (X-axis direction). Accordingly, in order to reduce RF signal interference between the first RF contact 211 and the second RF contact 212, the transmission contacts 220 may be disposed in a separation space between the first RF contact 211 and the second RF contact 212. Therefore, in the board connector 200 according to the first embodiment, the separation distance between the first RF contact 211 and the second RF contact 212 may be increased to reduce RF signal interference, and also the transmission contacts 220 may be disposed in the separation space for reducing the RF signal interference to improve utilization of a space of the insulating part 240.

The transmission contacts 220 may be spaced apart from each other. The transmission contacts 220 may be mounted on the first board to be electrically connected to the first board. In this case, a transmission mounting member 2201 of each of the transmission contacts 220 may be mounted on the first board. The transmission contacts 220 may be formed of a material having electrical conductivity. For example, the transmission contacts 220 may be formed of a metal. The transmission contacts 220 may be connected to transmission contacts of the counterpart connector to be electrically connected to the second board on which the counterpart connector is mounted. Accordingly, the first board and the second board may be electrically connected.

First transmission contacts 221 among the transmission contacts 220 and second transmission contacts 222 among the transmission contacts 220 may be spaced apart from each other in a second axial direction (Y-axis direction). The second axial direction (Y-axis direction) is an axial direction perpendicular to the first axial direction (X-axis direction). The first transmission contacts 221 may be spaced apart from each other in the first axial direction (X-axis direction). The second transmission contacts 222 may be spaced apart from each other in the first axial direction (X-axis direction).

Referring to FIGS. 2 to 5, the insulating part 240 is coupled to the ground housing 230. The ground housing 230 may be mounted on the first board to be grounded. Accordingly, the ground housing 230 may implement a function of shielding the RF contacts 210 from signals, electromagnetic waves, or the like. In this case, the ground housing 230 can prevent electromagnetic waves generated from the RF contacts 210 from interfering with signals of circuit components positioned around an electronic device and can prevent electromagnetic waves generated from the circuit components positioned around the electronic device from interfering with RF signals transmitted by the RF contacts 210. Accordingly, the board connector 200 according to the first embodiment may contribute to improving electromagnetic interference (EMI) shielding performance and electromagnetic compatibility (EMC) performance using the ground housing 230. The ground housing 230 may be formed of a material having electrical conductivity. For example, the ground housing 230 may be formed of a metal.

The ground housing 230 may be disposed to surround sides of an inner space 230*a*. A portion of the insulating part 240 may be positioned in the inner space 230*a*. All of the first RF contact 211, the second RF contact 212, and the transmission contacts 220 may be positioned in the inner space 230*a*. In this case, all of the first RF mounting member 2111, the second RF mounting member 2121, and the transmission mounting members 2201 may also be positioned in the inner space 230*a*. Accordingly, the ground housing 230 implements a shielding wall for both of the first RF contact 211 and the second RF contact 212, thereby strengthening a shielding function for the first RF contact 211 and the second RF contact 212 to implement complete shielding. The counterpart connector may be inserted into the inner space 230*a*.

The ground housing 230 may be disposed to surround all sides of the inner space 230*a*. The inner space 230*a* may be disposed inside the ground housing 230. When the entirety of the ground housing 230 is formed in a quadrangular ring shape, the inner space 230*a* may be formed in a rectangular parallelepiped shape. In this case, the ground housing 230 may be disposed to surround four sides of the inner space 230*a*.

The ground housing 230 may be integrally formed without a seam. The ground housing 230 may be integrally formed without a seam through a metal injection method such as a metal die casting method or a metal injection molding (MIM) method. The ground housing 230 may be integrally formed without a seam through computer numerical control (CNC) machining, machining center tool (MCT) machining, or the like.

Referring to FIGS. 2 to 5, the insulating part 240 supports the RF contacts 210. The RF contacts 210 and the transmission contacts 220 may be coupled to the insulating part 240. The insulating part 240 may be formed of an insulating material. The insulating part 240 may be coupled to the ground housing 230 such that the RF contacts 210 are positioned in the inner space 230*a*.

Referring to FIGS. 2 to 6, the board connector 200 according to the first embodiment may include a first ground contact 250.

The first ground contact 250 is coupled to the insulating part 240. The first ground contact 250 may be mounted on the first board to be grounded. The first ground contact 250 may be coupled to the insulating part 240 through an assembly process. The first ground contact 250 may be molded integrally with the insulating part 240 through injection molding.

The first ground contact 250 may implement a shielding function for the first RF contact 211 together with the ground housing 230. In this case, the first ground contact 250 may be disposed between the first RF contact 211 and the transmission contacts 220 in the first axial direction (X-axis direction). The first ground contact 250 may be formed of a material having electrical conductivity. For example, the first ground contact 250 may be formed of a metal. When the counterpart connector is inserted into the inner space 230*a*, the first ground contact 250 may be connected to a ground contact of the counterpart connector.

Referring to FIGS. 2 to 5, the board connector 200 according to the first embodiment may include a second ground contact 260.

The second ground contact 260 is coupled to the insulating part 240. The second ground contact 260 may be mounted on the first board to be grounded. The second ground contact 260 may be coupled to the insulating part 240 through an assembly process. The second ground contact 260 may be molded integrally with the insulating part 240 through injection molding.

The second ground contact 260 may implement a shielding function for the second RF contact 212 together with the ground housing 230. The second ground contact 260 may be disposed between the transmission contacts 220 and the second RF contact 212 in the first axial direction (X-axis direction). The second ground contact 260 may be formed of a material having electrical conductivity. For example, the second ground contact 260 may be formed of a metal. When the counterpart connector is inserted into the inner space 230*a*, the second ground contact 260 may be connected to a ground contact of the counterpart connector.

Here, the board connector 200 according to the first embodiment may be implemented to include a plurality of first RF contacts 211 and a plurality of second RF contacts 212.

Referring to FIGS. 2 to 9, the first RF contacts 211 and the second RF contacts 212 may be spaced apart from each other in the first axial direction (X-axis direction). The transmission contacts 220 may be disposed between the first RF contacts 211 and the second RF contacts 212 in the first axial direction (X-axis direction). In this case, the first ground contact 250 may shield the first RF contacts 211 from the transmission contacts 220 in the first axial direction (X-axis direction). The second ground contact 260 may shield the second RF contacts 212 from the transmission contacts 220 in the first axial direction (X-axis direction).

When the plurality of first RF contacts 211 are provided, the first ground contact 250 may not only shield the first RF contacts 211 from the transmission contacts 220 in the first axial direction (X-axis direction) but may also shield the first RF contacts 211 from each other in the second axial direction (Y-axis direction). Accordingly, in the board connector 200 according to the first embodiment, by using the first ground contact 250, it is possible to not only implement a shielding function between the first RF contacts 211 and the transmission contacts 220 but also additionally implement a shielding function between the first RF contacts 211. Accordingly, the board connector 200 according to the first embodiment may be implemented to transmit a wider variety of RF signals using the first RF contacts 211, thereby improving versatility and making it applicable to a wider variety of electronic products.

Figure 5:
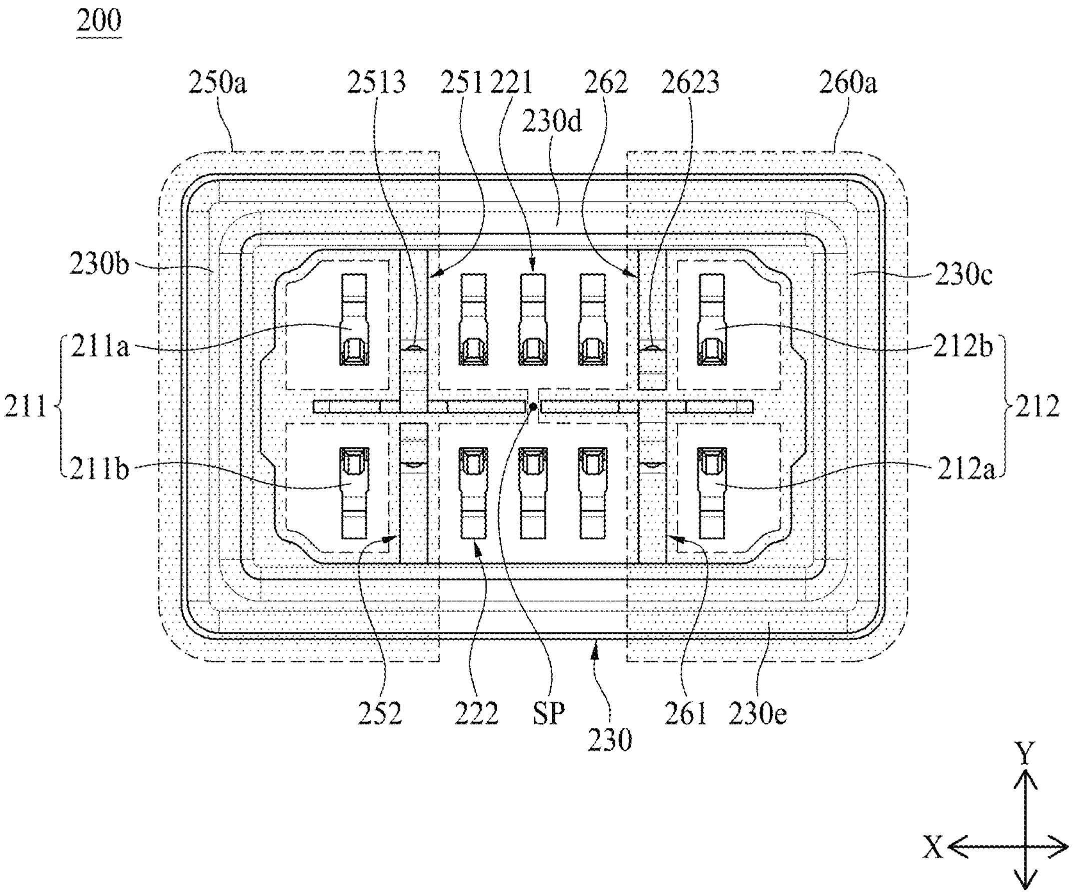
FIG. 5 is a conceptual plan view for describing a ground loop in the board connector according to the first embodiment.
Figure 6:
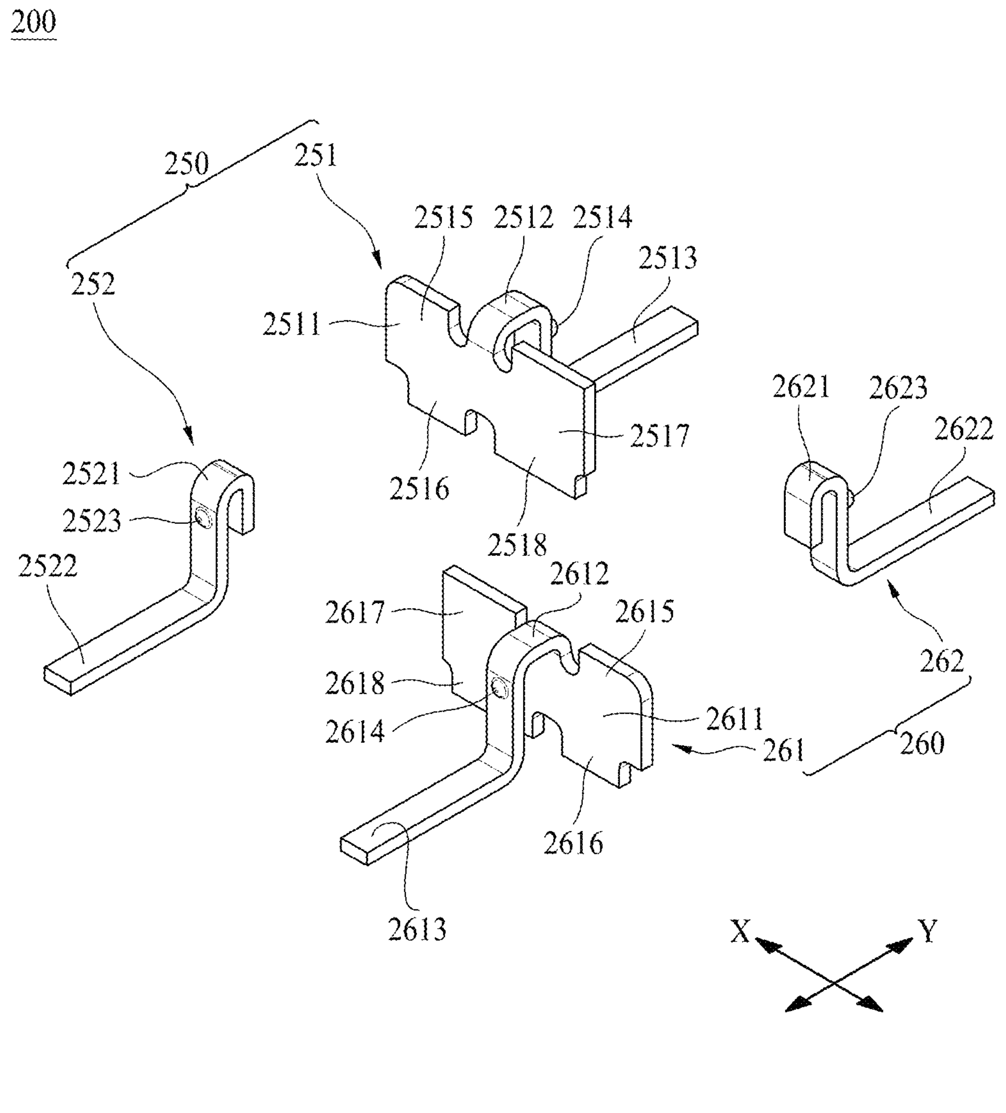
FIG. 6 shows schematic perspective views of a first ground contact and a second ground contact in the board connector according to the first embodiment.

A 1-1 RF contact 211*a* among the first RF contacts 211 and a 1-2 RF contact 211*b* among the first RF contacts 211 may be spaced apart from each other in the second axial direction (Y-axis direction). Although the board connector 200 according to the first embodiment is illustrated in FIG. 5 as including two first RF contacts 211 implemented as the 1-1 RF contact 211*a* and the 1-2 RF contact 211*b*, the present disclosure is not limited thereto, and the board connector 200 according to the first embodiment may include three or more first RF contacts 211. Meanwhile, in the present specification, description will be provided based on the board connector 200 according to the first embodiment including the 1-1 RF contact 211*a* and the 1-2 RF contact 211*b*.

When the 1-1 RF contact 211*a* and the 1-2 RF contact 211*b* are provided, the first ground contact 250 may include a 1-1 ground contact 251.

The 1-1 ground contact 251 may not only shield the 1-1 RF contact 211*a* from the transmission contacts 220 in the first axial direction (X-axis direction) but may also shield the 1-1 RF contact 211*a* from the 1-1 RF contact 211*b* in the second axial direction (Y-axis direction). Accordingly, in the board connector 200 according to the first embodiment, even when the 1-1 RF contact 211*a* and the 1-2 RF contact 211*b* transmit different RF signals, it is possible to prevent signal interference or the like between the 1-1 RF contact 211*a* and the 1-2 RF contact 211*b* using the 1-1 ground contact 251. Accordingly, the board connector 200 according to the first embodiment is implemented to stably transmit a wider variety of RF signals using the 1-1 RF contact 211*a* and the 1-2 RF contact 211*b*. A portion of the 1-1 ground contact 251 may be positioned between the 1-1 RF contact 211*a* and the first transmission contacts 221 in the first axial direction (X-axis direction). A portion of the 1-1 ground contact 251 may be disposed between the 1-1 RF contact 211*a* and the 1-2 RF contact 211*b* in the second axial direction (Y-axis direction).

The 1-1 ground contact 251 may include a 1-1 shielding member 2511.

The 1-1 shielding member 2511 may be positioned between the 1-1 RF contact 211*a* and the 1-2 RF contact 211*b* in the second axial direction (Y-axis direction). Accordingly, the 1-1 ground contact 251 may shield the 1-1

RF contact 211*a* from the 1-2 RF contact 211*b* using the 1-1 shielding member 2511. Therefore, the 1-1 ground contact 251 may prevent signal interference or the like between the 1-1 RF contact 211*a* and the 1-2 RF contact 211*b* using the 1-1 shielding member 2511. The 1-1 shielding member 2511 may be formed in a plate shape disposed in the vertical direction between the 1-1 RF contact 211*a* and the 1-2 RF contact 211*b*.

The 1-1 shielding member 2511 may be spaced the same distance from the 1-1 RF contact 211*a* and the 1-2 RF contact 211*b* in the second axial direction (Y-axis direction). Accordingly, in the board connector 200 according to the first embodiment, it is possible to reduce a deviation between shielding performance for the 1-1 RF contact 211*a* and shielding performance for the 1-2 RF contact 211*b*. Therefore, in the board connector 200 according to the first embodiment, a shielding function can be stably implemented for each of the 1-1 RF contact 211*a* and the 1-2 RF contact 211*b* using the 1-1 shielding member 2511.

The 1-1 ground contact 251 may include a 1-1 ground connection member 2512 and a 1-1 ground mounting member 2513.

The 1-1 ground connection member 2512 is coupled to the 1-1 shielding member 2511. Each of the 1-1 shielding member 2511 and the 1-1 ground mounting member 2513 may be coupled to the 1-1 ground connection member 2512. The 1-1 shielding member 2511 and the 1-1 ground mounting member 2513 may be connected to each other through the 1-1 ground connection member 2512. The 1-1 ground connection member 2512 may be connected to the ground contact of the counterpart connector.

Accordingly, the first ground contact 250 may be connected to the ground contact of the counterpart connector through the 1-1 ground connection member 2512 to be electrically connected to the ground contact of the counterpart connector. Accordingly, it is possible to strengthen shielding power of the first ground contact 250 for the first RF contacts 211. The 1-1 shielding member 2511 may be coupled to the 1-1 ground connection member 2512. The 1-1 shielding member 2511 may protrude from the 1-1 ground connection member 2512 in the first axial direction (X-axis direction). The 1-1 ground connection member 2512 may be formed in a plate shape disposed in the vertical direction. In this case, the 1-1 ground connection member 2512 may be implemented to be disposed in the vertical direction through bending a plate material.

The 1-1 ground mounting member 2513 is mounted on the first board. The 1-1 ground mounting member 2513 may be mounted on the first board to be grounded. Accordingly, the 1-1 ground contact 251 may be grounded to the first board through the 1-1 ground mounting member 2513. The 1-1 ground mounting member 2513 may be positioned between the 1-1 RF contact 211*a* and the transmission contacts 220 in the first axial direction (X-axis direction). Accordingly, the 1-1 ground mounting member 2513 may shield the 1-1 RF contact 211*a* from the transmission contacts 220 in the first axial direction (X-axis direction). The 1-1 ground mounting member 2513 may protrude from the 1-1 ground connection member 2512 in the second axial direction (Y-axis direction). The 1-1 ground mounting member 2513 may protrude from the 1-1 ground connection member 2512 in the second axial direction (Y-axis direction) by a length sufficient to be coupled to the ground housing 230. In this case, the 1-1 ground mounting member 2513 may protrude from the 1-1 ground connection member 2512 to be connected to a sidewall of the ground housing 230. The 1-1 ground mounting member 2513 may be formed in a plate shape disposed in a horizontal direction. The 1-1 ground mounting member 2513 may be mounted on a mounting pattern 2513*a* (shown in FIG. 8) of the first board.

The 1-1 ground contact 251 may include a 1-1 connection protrusion 2514 (shown in FIG. 8).

The 1-1 connection protrusion 2514 protrudes from the 1-1 ground connection member 2512. When the 1-1 ground connection member 2512 is connected to the ground contact of the counterpart connector, the 1-1 connection protrusion 2514 may be connected to the ground contact of the counterpart connector. The 1-1 connection protrusion 2514 may be formed in a shape which protrudes from the 1-1 ground connection member 2512 such that a size thereof is decreased. For example, the 1-1 connection protrusion 2514 may be formed in a hemispherical shape protruding from the 1-1 ground connection member 2512. By using the 1-1 connection protrusion 2514, it is possible to strengthen a connection force between the 1-1 ground connection member 2512 and the ground contact of the counterpart connector.

The 1-1 ground contact 251 may include a 1-1 connection protruding member 2515.

The 1-1 connection protruding member 2515 protrudes from the 1-1 shielding member 2511. The 1-1 connection protruding member 2515 may be connected to the ground housing of the counterpart connector or a ground contact of the counterpart connector. Accordingly, in the board connector 200 according to the first embodiment, it is possible to increase a connection area in which the 1-1 ground contact 251 is connected to the ground housing of the counterpart connector or the ground contact of the counterpart connector, thereby further strengthening shielding performance using the 1-1 ground contact 251. The 1-1 connection protruding member 2515 may pass through the insulating part 240 and protrude from the insulating part 240 to be connected to the ground housing of the counterpart connector or the ground contact of the counterpart connector. The 1-1 connection protruding member 2515 may also be inserted into an insulating part of the counterpart connector to be connected to the ground housing of the counterpart connector or the ground contact of the counterpart connector. In this case, a through hole into which the 1-1 connection protruding member 2515 is inserted may be formed in the insulating part of the counterpart connector. The 1-1 connection protruding member 2515 may protrude from the 1-1 shielding member 2511 in the vertical direction. The 1-1 connection protruding member 2515 may be formed in a plate shape disposed in the vertical direction.

The 1-1 ground contact 251 may include a 1-1 ground protruding member 2516.

The 1-1 ground protruding member 2516 protrudes from the 1-1 shielding member 2511. The 1-1 ground protruding member 2516 may be mounted on the first board. Accordingly, in the board connector 200 according to the first embodiment, it is possible to increase a mounting area in which the 1-1 ground contact 251 is mounted on the first board, thereby further strengthening shielding performance using the 1-1 ground contact 251. The 1-1 ground protruding member 2516 may pass through the insulating part 240 and protrude from the insulating part 240 to be mounted on the first board. The 1-1 ground protruding member 2516 may protrude from the 1-1 shielding member 2511 in the vertical direction. In the vertical direction, the 1-1 connection protruding member 2515 and the 1-1 ground protruding member 2516 may protrude from the 1-1 shielding member 2511 in opposite directions. The 1-1 ground protruding member 2516 may be formed in a plate shape disposed in the vertical direction.

The 1-1 ground protruding member 2516 and the 1-1 ground mounting member 2513 may be mounted on the first board at different positions. Accordingly, in the board connector 200 according to the first embodiment, by increasing the number of points at which the 1-1 ground contact 251 is grounded through the first board, even when the 1-1 ground contact 251 and the ground contact of the counterpart connector are connected at a plurality of contact points, the contact points are implemented to be grounded to the first board through various paths. Accordingly, in the board connector 200 according to the first embodiment, it is possible to decrease a grounding distance by which each of the contact points is grounded to the first board, thereby reducing a deviation in grounding performance for each of the contact points.

For example, when the 1-1 ground protruding member 2516 is not provided, since a contact point at which the 1-1 connection protruding member 2515 is connected to the ground housing of the counterpart connector or the ground contact of the counterpart connector is grounded to the first board through the 1-1 ground mounting member 2513 via the 1-1 shielding member 2511 and the first ground connection member 2512, the contact point may be implemented to have a longer grounding distance than a contact point between the first ground connection member 2512 and the ground contact of the counterpart connector.

On the other hand, when the 1-1 ground protruding member 2516 is provided, since a contact point at which the 1-1 connection protruding member 2515 is connected to the ground housing of the counterpart connector or the ground contact of the counterpart connector is grounded to the first board through the 1-1 ground protruding member 2516 via the 1-1 shielding member 2511, the contact point may be implemented to have substantially the same grounding distance as the contact point between the first ground connection member 2512 and the ground contact of the counterpart connector as indicated by a dotted arrow in FIG. 8. For example, a contact point at which the 1-1 connection protruding member 2515 is connected to a 1-1 ground coupling member 3513 of a 1-1 ground contact 351 of a counterpart connector 300 may be grounded to the first board through the 1-1 ground protruding member 2516 via the 1-1 shielding member 2511 as indicated by the dotted arrow of FIG. 8. Accordingly, in the board connector 200 according to the first embodiment, a grounding distance by which each of the contact points is grounded to the first board can be reduced using the 1-1 ground protruding member 2516. In this case, the 1-1 ground protruding member 2516 may be mounted on a mounting pattern 2516*a* (shown in FIG. 8) of the first board.

The 1-1 ground contact 251 may include a 1-1 transmission shielding member 2517.

The 1-1 transmission shielding member 2517 is positioned between the first transmission contacts 221 and the second transmission contacts 222 in the second axial direction (Y-axis direction). The 1-1 transmission shielding member 2517 may shield the first transmission contacts 221 from the second transmission contacts 222 in the second axial direction (Y-axis direction). Accordingly, the 1-1 ground contact 251 can prevent signal interference or the like between the first transmission contacts 221 and the second transmission contacts 222 using the 1-1 transmission shielding member 2517. Accordingly, the board connector 200 according to the first embodiment may transmit a wider variety of signals, data, power, and the like using the first transmission contacts 221 and the second transmission contacts 222, thereby improving versatility and making it applicable to a wider variety of electronic products. The 1-1 transmission shielding member 2517 may be formed in a plate shape disposed in the vertical direction between the first transmission contacts 221 and the second transmission contacts 22.

The 1-1 transmission shielding member 2517 may be spaced the same distance from the first transmission contacts 221 and the second transmission contacts 222 in the second axial direction (Y-axis direction). Accordingly, in the board connector 200 according to the first embodiment, it is possible to reduce a deviation between shielding performance for the first transmission contacts 221 and shielding performance for the second transmission contacts 222.

The 1-1 transmission shielding member 2517 and the 1-1 shielding member 2511 may protrude from the 1-1 ground connection member 2512 in opposite directions in the first axial direction (X-axis direction). In this case, the 1-1 transmission shielding member 2517 and the 1-1 shielding member 2511 may be disposed to be collinear with each other. Accordingly, in the board connector 200 according to the first embodiment, a shielding function for the first RF contacts 211 and a shielding function for the transmission contacts 220 can be implemented using the 1-1 transmission shielding member 2517 and the 1-1 shielding member 2511, and also, miniaturization can be implemented by reducing an overall size in the second axial direction (Y-axis direction).

The 1-1 ground contact 251 may include a 1-1 transmission ground protrusion 2518.

The 1-1 transmission ground protrusion 2518 protrudes from the 1-1 transmission shielding member 2517. The 1-1 transmission ground protrusion 2518 may be mounted on the first board. Accordingly, in the board connector 200 according to the first embodiment, it is possible to increase a mounting area in which the 1-1 ground contact 251 is mounted on the first board, thereby further strengthening shielding performance using the 1-1 ground contact 251. The 1-1 transmission ground protrusion 2518 may pass through the insulating part 240 and protrude from the insulating part 240 to be mounted on the first board. The 1-1 transmission ground protrusion 2518 may protrude from the 1-1 transmission shielding member 2517 in the vertical direction. The 1-1 transmission ground protrusion 2518 may be formed in a plate shape disposed in the vertical direction.

The 1-1 transmission ground protrusion 2518 and the 1-1 ground mounting member 2513 may be mounted on the first board at different positions. Accordingly, in the board connector 200 according to the first embodiment, by increasing the number of points at which the 1-1 ground contact 251 is grounded through the first board, it is possible to reduce a deviation in grounding distance by which each of the contact points between the 1-1 ground contact 251 and the ground contact of the counterpart connector is grounded to the first board. Accordingly, in the board connector 200 according to the first embodiment, it is possible to reduce a deviation in grounding performance for each of the contact points between the 1-1 ground contact 251 and the ground contact of the counterpart connector.

In this case, an upper portion of the 1-1 transmission shielding member 2517 may be connected to the ground housing of the counterpart connector or the ground contact of the counterpart connector. The 1-1 transmission ground protrusion 2518 may be coupled to a lower portion of the 1-1 transmission shielding member 2517. Accordingly, in the board connector 200 according to the first embodiment, by using the 1-1 transmission shielding member 2517, it is possible to increase a connection area in which the 1-1 ground contact 251 is connected to the ground housing of the counterpart connector or the ground contact of the counterpart connector, thereby further strengthening shielding performance using the 1-1 ground contact 251. In addition, a contact point, at which the upper portion of the 1-1 transmission shielding member 2517 is connected to the ground housing of the counterpart connector or the ground contact of the counterpart connector, may be grounded to the first board through the 1-1 transmission ground protrusion 2518 via the 1-1 transmission shielding member 2517 as indicated by the dotted arrow of FIG. 8. For example, a contact point at which the 1-1 connection protruding member 2515 is connected to a 1-1 transmission shielding member 3516 of the 1-1 ground contact 351 of the counterpart connector 300 may be grounded to the first board through the 1-1 ground protruding member 2516 via the 1-1 shielding member 2511 as indicated by the dotted arrow of FIG. 8. Accordingly, in the board connector 200 according to the first embodiment, it is possible to decrease a grounding distance of the contact point at which the upper portion of the 1-1 transmission shielding member 2517 is connected to the ground housing of the counterpart connector or the ground contact of the counterpart connector. In this case, the 1-1 transmission ground protrusion 2518 may be mounted on a mounting pattern 2518*a* (shown in FIG. 8) of the first board.

The first ground contact 250 may include a 1-2 ground contact 252.

The 1-2 ground contact 252 may be positioned between the 1-2 RF contact 211*b* and the transmission contacts 220 in the first axial direction (X-axis direction). Accordingly, the 1-2 ground contact 252 may shield the 1-2 RF contact 211*b* from the transmission contacts 220. The 1-2 ground contact 252 may be spaced apart from the 1-1 ground contact 251 in the second axial direction (Y-axis direction). The 1-2 ground contact 252 and the 1-1 ground contact 251 may be formed in different shapes. For example, the 1-2 ground contact 252 may be formed in a shape not including the 1-1 shielding member 2511, the 1-1 connection protrusion 2514, the 1-1 connection protruding member 2515, the 1-1 ground protruding member 2516, the 1-1 transmission shielding member 2517, and the 1-1 transmission ground protrusion 2518 of the 1-1 ground contact 251. Accordingly, in the board connector 200 according to the first embodiment, as compared with an embodiment in which the 1-2 ground contact 252 is formed in the same shape as the 1-1 ground contact 251, it is possible to not only improve the easiness of a manufacturing operation of manufacturing the 1-2 ground contact 252 but also reduce material costs for manufacturing the 1-2 ground contact 252. In this case, the shielding between the 1-1 RF contact 211*a* and the 1-2 RF contact 211*b* may be performed by the 1-1 ground contact 251.

The 1-2 ground contact 252 may include a 1-2 ground connection member 2521 and a 1-2 ground mounting member 2522.

The 1-2 ground connection member 2521 is to be connected to the ground contact of the counterpart connector. The first ground contact 250 may be connected to the ground contact of the counterpart connector through the 1-2 ground connection member 2521 to be electrically connected to the ground contact of the counterpart connector. Accordingly, a gap generated due to the 1-2 ground contact 252 and the 1-1 ground contact 251 being spaced apart from each other in the second axial direction (Y-axis direction) can be shielded by the first ground contact 250 being connected to the ground contact of the counterpart connector through the 1-2 ground connection member 2521. In this case, both the 1-2 ground connection member 2521 and the 1-1 ground connection member 2512 may be connected to the ground contact of the counterpart connector.

The 1-2 ground mounting member 2522 is mounted on the first board. The 1-2 ground mounting member 2522 may be mounted on the first board to be grounded. Accordingly, the 1-2 ground contact 252 may be grounded to the first board through the 1-2 ground mounting member 2522. The 1-2 ground mounting member 2522 may protrude from the 1-2 ground connection member 2521 in the second axial direction (Y-axis direction). Accordingly, in this case, the 1-2 ground mounting member 2522 may be disposed between the 1-2 RF contact 211*b* and the second transmission contacts 222 in the first axial direction (X-axis direction). The 1-2 ground mounting member 2522 may protrude from the 1-2 ground connection member 2521 in the second axial direction (Y-axis direction) by a length sufficient to be coupled to the ground housing 230. In this case, the 1-2 ground mounting member 2522 and the 1-1 ground mounting member 2513 may protrude in opposite directions to be connected to sidewalls of the ground housing 230 facing each other. Here, in the board connector 200 according to the first embodiment, it is possible to further strengthen shielding performance between the first RF contacts 211 and the transmission contact 220. The 1-2 ground mounting member 2522 may be formed in a plate shape disposed in the horizontal direction.

The 1-2 ground contact 252 may include a 1-2 connection protrusion 2523.

The 1-2 connection protrusion 2523 protrudes from the 1-2 ground connection member 2521. When the 1-2 ground connection member 2521 is connected to the ground contact of the counterpart connector, the 1-2 connection protrusion 2523 may be connected to the ground contact of the counterpart connector. The 1-2 connection protrusion 2523 may be formed in a shape which protrudes from the 1-2 ground connection member 2521 such that a size thereof is decreased. For example, the 1-2 connection protrusion 2523 may be formed in a hemispherical shape protruding from the 1-2 ground connection member 2521. By using the 1-2 connection protrusion 2523, it is possible to strengthen a connection force between the 1-2 ground connection member 2521 and the ground contact of the counterpart connector. The 1-2 connection protrusion 2523 and the 1-1 connection protrusion 2514 may protrude in opposite directions in the second axial direction (Y-axis direction).

As described above, in the board connector 200 according to the first embodiment, a first ground loop 250*a* (shown in FIG. 5) for the 1-1 RF contact 211*a* and the 1-2 RF contact 211*b* may be implemented using the 1-1 ground contact 251, the 1-2 ground contact 252, and the ground housing 230. Accordingly, in the board connector 200 according to the first embodiment, shielding performance for the 1-1 RF contact 211*a* and the 1-2 RF contact 211*b* is further strengthened using the first ground loop 250*a*, thereby implementing complete shielding for the 1-1 RF contact 211*a* and the 1-2 RF contact 211*b*.

Referring to FIGS. 2 to 9, when the plurality of second RF contacts 212 are provided, the second ground contact 260 may not only shield the second RF contacts 212 from the transmission contacts 220 in the first axial direction (X-axis direction) but may also shield the second RF contacts 212 from each other in the second axial direction (Y-axis direction). Accordingly, in the board connector 200 according to the first embodiment, by using the second ground contact 260, it is possible to not only implement a shielding function between the second RF contacts 212 and the transmission contacts 220 but also additionally implement a shielding function between the second RF contacts 212. Accordingly, the board connector 200 according to the first embodiment may be implemented to transmit a wider variety of RF signals using the second RF contacts 212, thereby improving versatility and making it applicable to a wider variety of electronic products.

A 2-1 RF contact 212*a* of the second RF contacts 212 and a 2-2 RF contact 212*b* of the second RF contacts 212 may be spaced apart from each other in the second axial direction (Y-axis direction). Although the board connector 200 according to the first embodiment is illustrated in FIG. 5 as including two second RF contacts 212 implemented as the 2-1 RF contact 212*a* and the 2-2 RF contact 212*b*, the present disclosure is not limited thereto, and the board connector 200 according to the first embodiment may include three or more second RF contacts 212. Meanwhile, in the present specification, description will be provided based on the board connector 200 according to the first embodiment including the 2-1 RF contact 212*a* and the 2-2 RF contact 212*b*.

When the 2-1 RF contact 212*a* and the 2-2 RF contact 212*b* are provided, the second ground contact 260 may include a 2-1 ground contact 261.

The 2-1 ground contact 261 may not only shield the 2-1 RF contact 212*a* from the transmission contacts 220 in the first axial direction (X-axis direction) but may also shield the 2-1 RF contact 212*a* from the 2-2 RF contact 212*b* in the second axial direction (Y-axis direction). Accordingly, the board connector 200 according to the first embodiment may be implemented to transmit a wider variety of RF signals using the second RF contacts 212, thereby improving versatility and making it applicable to a wider variety of electronic products. A portion of the 2-1 ground contact 261 may be positioned between the 2-1 RF contact 212*a* and the second transmission contacts 222 in the first axial direction (X-axis direction) to implement shielding power. In this case, the second transmission contacts 222 may be disposed between the 1-2 RF contact 211*b* and the 2-1 RF contact 212*a* in the first axial direction (X-axis direction). A portion of the 2-1 ground contact 261 may be disposed between the 2-1 RF contact 212*a* and the 2-2 RF contact 212*b* in the second axial direction (Y-axis direction). In this case, the 2-2 RF contact 212*b* may be spaced apart from the 1-1 RF contact 211*a* in the first axial direction (X-axis direction).

The 2-1 ground contact 261 may include at least one of a 2-1 shielding member 2611, a 2-1 ground connection member 2612, a 2-1 ground mounting member 2613, a 2-1 connection protrusion 2614, a 2-1 connection protruding member 2615, a 2-1 ground protruding member 2616, a 2-1 transmission shielding member 2617, and a 2-1 transmission ground protrusion 2618. In this case, since the 2-1 shielding member 2611, the 2-1 ground connection member 2612, the 2-1 ground mounting member 2613, the 2-1 connection protrusion 2614, the 2-1 connection protruding member 2615, the 2-1 ground protruding member 2616, the 2-1 transmission shielding member 2617, and the 2-1 transmission ground protrusion 2618 may be implemented to be substantially identical to the 1-1 shielding member 2511, the 1-1 ground connection member 2512, the 1-1 ground mounting member 2513, the 1-1 connection protrusion 2514, the 1-1 connection protruding member 2515, the 1-1 ground protruding member 2516, the 1-1 transmission shielding member 2517, and the 1-1 transmission ground protrusion 2518, respectively, detailed description thereof will be omitted.

The 2-1 ground contact 261 and the 1-1 ground contact 251 may be formed in the same shape. Accordingly, in the board connector 200 according to the first embodiment, it is possible to improve the easiness of a manufacturing operation of manufacturing each of the 2-1 ground contact 261 and the 1-1 ground contact 251. In this case, as shown in FIG. 5, the 2-1 ground contact 261 and the 1-1 ground contact 251 may be disposed to be point-symmetrical with respect to a point of symmetry SP. The point of symmetry SP is a point that is spaced the same distance from both sidewalls 230*b* and 230*c* of the ground housing 230 spaced apart from each other in the first axial direction (X-axis direction) and is also spaced the same distance from both sidewalls 230*d* and 230*e* of the ground housing 230 spaced apart from each other in the second axial direction (Y-axis direction). Accordingly, in the board connector 200 according to the first embodiment, since the 2-1 ground contact 261 and the 1-1 ground contact 251 are formed in the same shape and differ only in arrangement direction, it is possible to further improve the easiness of a manufacturing operation of manufacturing the 2-1 ground contact 261 and the 1-1 ground contact 251. In this case, the 2-1 RF contact 212*a* and the 1-1 RF contact 211*a* may be disposed to be point-symmetrical with respect to the point of symmetry SP. In this case, the 2-2 RF contact 212*b* and the 1-2 RF contact 211*b* may be disposed to be point-symmetrical with respect to the point of symmetry SP.

Meanwhile, the 2-1 shielding member 2611, the 2-1 transmission shielding member 2617, the 1-1 shielding member 2511, and the 1-1 transmission shielding member 2517 may be disposed to be collinear with each other. Accordingly, in the board connector 200 according to the first embodiment, it is possible to not only implement shielding power between the second RF contacts 212, shielding power between the first RF contacts 211, and shielding power between the first transmission contacts 221 and the second transmission contacts 222 but also implement miniaturization by reducing an overall size in the second axial direction (Y-axis direction). The 2-1 transmission shielding member 2617 and the 1-1 transmission shielding member 2517 may be spaced apart from each other in the first axial direction (X-axis direction).

The second ground contact 260 may include a 2-2 ground contact 262.

The 2-2 ground contact 262 may be positioned between the 2-2 RF contact 212*b* and the transmission contacts 220 in the first axial direction (X-axis direction). The 2-2 ground contact 262 may shield the 2-2 RF contact 212*b* from the transmission contacts 220. In this case, the 2-2 second ground contact 262 may be disposed between the 2-2 RF contact 212*b* and the first transmission contacts 221. The 2-2 ground contact 262 may be spaced apart from the 2-1 ground contact 261 in the second axial direction (Y-axis direction).

The 2-2 ground contact 262 may include at least one of a 2-2 ground connection member 2621, a 2-2 ground mounting member 2622, and a 2-2 connection protrusion 2623. In this case, since the 2-2 ground connection member 2621, the 2-2 ground mounting member 2622, and the 2-2 connection protrusion 2623 may be implemented to be substantially identical to the 1-1 ground connection member 2521, the 1-2 ground mounting member 2522, and the 1-2 connection protrusion 2523, respectively, detailed description thereof will be omitted.

The 2-2 ground contact 262 and the 1-2 ground contact 252 may be formed in the same shape. Accordingly, in the board connector 200 according to the first embodiment, it is possible to improve the easiness of a manufacturing operation of manufacturing each of the 2-2 ground contact 262 and the 1-2 ground contact 252. In this case, as shown in FIG. 5, the 2-2 ground contact 262 and the 1-2 ground contact 252 may be disposed to be point-symmetrical with respect to the point of symmetry SP. Accordingly, in the board connector 200 according to the first embodiment, since the 2-2 ground contact 262 and the 1-2 ground contact 252 are formed in the same shape and differ only in arrangement direction, it is possible to further improve the easiness of a manufacturing operation of manufacturing the 2-2 ground contact 262 and the 1-2 ground contact 252.

Referring to FIGS. 2 to 9, in the board connector 200 according to the first embodiment, the ground housing 230 may be implemented as follows.

The ground housing 230 may include a ground inner wall 231, a ground outer wall 232, and a ground connection wall 233.

The ground inner wall 231 faces the insulating part 240. The ground inner wall 231 may be disposed to face the inner space 230*a*. The 1-1 ground contact 251 and the 2-1 ground contact 261 may each be connected to the ground inner wall 231. The ground inner wall 231 may be disposed to surround all sides of the inner space 230*a*. Although not shown, the ground inner wall 231 may include a plurality of sub-ground inner walls, and the sub-ground inner walls may be disposed at different sides of the inner space 230*a*. In this case, the sub-ground inner walls may be spaced apart from each other.

The ground inner wall 231 may be connected to the ground housing of the counterpart connector inserted into the inner space 230*a*. For example, as shown in FIG. 9, the ground inner wall 231 may be connected to a ground housing 330 of the counterpart connector. As described above, in the board connector 200 according to the first embodiment, a shielding function can be further strengthened through the connection between the ground housing 230 and the ground housing of the counterpart connector. In addition, in the board connector 200 according to the first embodiment, through the connection between the ground housing 230 and the ground housing of the counterpart connector, it is possible to reduce adverse electrical effects such as crosstalk, which may be caused by capacitance or induction between adjacent terminals. In this case, in the board connector 200 according to the first embodiment, it is possible to secure a path through which electromagnetic waves are introduced into at least one ground of the first board and the second board, thereby further strengthening EMI shielding performance.

The ground outer wall 232 is spaced apart from the ground inner wall 231. The ground outer wall 232 may be disposed outside the ground inner wall 231. The ground outer wall 232 may be disposed to surround all sides of the ground inner wall 231. The ground outer wall 232 and the ground inner wall 231 may be implemented as shielding walls surrounding the sides of the inner space 230*a*. The first RF contacts 211 and the second RF contacts 212 may be positioned in the inner space 230*a* surrounded by the shielding wall. Accordingly, the ground housing 230 may implement a shielding function for the RF contacts 210 using the shielding wall. Accordingly, the board connector 200 according to the first embodiment may contribute to further improving EMI shielding performance and EMC performance using the shielding wall.

The ground outer wall 232 may be mounted on the first board to be grounded. In this case, the ground housing 230 may be grounded through the ground outer wall 232. When one end of the ground outer wall 232 is coupled to the ground connection wall 233, the other end of the ground outer wall 232 may be mounted on the first board. In this case, the ground outer wall 232 may be formed at a higher level than the ground inner wall 231.

The ground connection wall 233 is coupled to each of the ground inner wall 231 and the ground outer wall 232. The ground connection wall 233 may be disposed between the ground inner wall 231 and the ground outer wall 232. The ground inner wall 231 and the ground outer wall 232 may be electrically connected to each other through the ground connection wall 233. Accordingly, when the ground outer wall 232 is mounted on the first board to be grounded, the ground connection wall 233 and the ground inner wall 231 may also be grounded to implement a shielding function.

The ground connection wall 233 may be coupled to each of one end of the ground outer wall 232 and one end of the ground inner wall 231. Referring to FIG. 9, one end of the ground outer wall 232 may correspond to an upper end of the ground outer wall 232, and one end of the ground inner wall 231 may correspond to an upper end of the ground inner wall 231. The ground connection wall 233 may be formed in a plate shape disposed in the horizontal direction, and the ground outer wall 232 and the ground inner wall 231 may each be formed in a plate shape disposed in the vertical direction. The ground connection wall 233, the ground outer wall 232, and the ground inner wall 231 may be integrally formed.

The ground connection wall 233 may be connected to the ground housing of the counterpart connector inserted into the inner space 230*a*. Accordingly, in the board connector 200 according to the first embodiment, the ground outer wall 232 and the ground connection wall 233 are connected to the ground housing of the counterpart connector to increase a contact area between the ground housing 230 and the ground housing of the counterpart connector, thereby further strengthening a shielding function.

A ground floor 234 protrudes from a lower end of the ground inner wall 231 toward the inner space 230*a*. That is, the ground floor 234 may protrude to the inside of the ground inner wall 231. The ground floor 234 may extend along the lower end of the ground inner wall 231 to be formed in a closed ring shape. The ground floor 234 may be mounted on the first board to be grounded. In this case, the ground housing 330 may be grounded through the ground floor 234. When the counterpart connector is inserted into the inner space 230*a*, the ground floor 234 may be connected to the ground housing of the counterpart connector. The ground floor 234 may be formed in a plate shape disposed in the horizontal direction.

Here, the ground housing 230 may implement a shielding function for the first RF contacts 211 together with the first ground contact 250. The ground housing 230 may implement a shielding function for the second RF contacts 212 together with the second ground contact 260.

In this case, as shown in FIG. 5, the ground housing 230 may include a first shielding wall 230*b*, a second shielding wall 230*c*, a third shielding wall 230*d*, and a fourth shielding wall 230*e*. Each of the first shielding wall 230*b*, the second shielding wall 230*c*, the third shielding wall 230*d*, and the fourth shielding wall 230*e* may be implemented by the ground inner wall 231, the ground outer wall 232, and the ground connection wall 233. The first shielding wall 230*b* and the second shielding wall 230*c* are disposed to face each other in the first axial direction (X-axis direction). The first RF contacts 211 and the second RF contacts 212 may be positioned between the first shielding wall 230*b* and the second shielding wall 230*c* in the first axial direction (X-axis direction). The first RF contacts 211 may be positioned at a position at which a separation distance from the first shielding wall 230*b* is shorter than a separation distance from the second shielding wall 230*c* in the first axial direction (X-axis direction). The second RF contacts 212 may be positioned at a position at which a separation distance from the second shielding wall 230*c* is shorter than a separation distance from the first shielding wall 230*b* in the first axial direction (X-axis direction). The third shielding wall 230*d* and the fourth shielding wall 230*e* are disposed to face each other in the second axial direction (Y-axis direction). The first RF contacts 211 and the second RF contacts 212 may be positioned between the third shielding wall 230*d* and the fourth shielding wall 230*e* in the second axial direction (Y-axis direction).

The first ground contact 250 may be disposed between the first RF contacts 211 and the transmission contacts 320 in the first axial direction (X-axis direction). Accordingly, the first RF contacts 211 may be positioned between the first shielding wall 230*b* and the first ground contact 250 in the first axial direction (X-axis direction) and may be positioned between the third shielding wall 230*d* and the fourth shielding wall 230*e* in the second axial direction (Y-axis direction). Therefore, in the board connector 200 according to the first embodiment, a shielding function for the first RF contacts 211 can be strengthened using the first ground contact 250, the first shielding wall 230*b*, the third shielding wall 230*d*, and the fourth shielding wall 230*e*. The first ground contact 250, the first shielding wall 230*b*, the third shielding wall 230*d*, and the fourth shielding wall 230*e* are disposed at four sides of the first RF contacts 211 to implement shielding power from RF signals. In this case, the first ground contact 250, the first shielding wall 230*b*, the third shielding wall 230*d*, and the fourth shielding wall 230*e* may implement the first ground loop 250*a* (shown in FIG. 5) for the first RF contacts 211. Accordingly, in the board connector 200 according to the first embodiment, a shielding function for the first RF contacts 211 is further strengthened using the first ground loop 250*a*, thereby implementing complete shielding for the first RF contacts 211.

The second ground contact 260 may be disposed between the second RF contacts 212 and the transmission contacts 320 in the first axial direction (X-axis direction). Accordingly, the second RF contacts 212 may be positioned between the second shielding wall 230*c* and the second ground contact 260 in the first axial direction (X-axis direction) and may be positioned between the third shielding wall 230*d* and the fourth shielding wall 230*e* in the second axial direction (Y-axis direction). Therefore, in the board connector 200 according to the first embodiment, a shielding function for the second RF contacts 212 can be strengthened using the second ground contact 260, the second shielding wall 230*c*, the third shielding wall 230*d*, and the fourth shielding wall 230*e*. The second ground contact 260, the second shielding wall 230*c*, the third shielding wall 230*d*, and the fourth shielding wall 230*e* are disposed at four sides of the second RF contacts 212 to implement shielding power from RF signals. In this case, the second ground contact 260, the second shielding wall 230*c*, the third shielding wall 230*d*, and the fourth shielding wall 230*e* may implement a second ground loop 260*a* (shown in FIG. 5) for the second RF contacts 212. Accordingly, in the board connector 200 according to the first embodiment, a shielding function for the second RF contacts 212 is further strengthened using the second ground loop 260*a*, thereby implementing complete shielding for the second RF contacts 212.

Referring to FIGS. 2 to 9, in the board connector 200 according to the first embodiment, the insulating part 240 may be implemented as follows.

The insulating part 240 may include an insulating member 241, an insertion member 242, and a connection member 243.

The insulating member 241 supports the RF contacts 210 and the transmission contacts 220. The insulating member 241 may be positioned in the inner space 230*a*. The insulating member 241 may be positioned inside the ground inner wall 231. The insulating member 241 may be inserted into an inner space of the counterpart connector.

The insertion member 242 is inserted between the ground inner wall 231 and the ground outer wall 232. When the insertion member 242 is inserted between the ground inner wall 231 and the ground outer wall 232, the insulating part 240 may be coupled to the ground housing 230. The insertion member 242 may be inserted between the ground inner wall 231 and the ground outer wall 232 in an interference fit manner. The insertion member 242 may be disposed outside the insulating member 241. The insertion member 242 may be disposed to surround the outside of the insulating member 241.

The connection member 243 is coupled to each of the insertion member 242 and the insulating member 241. The insertion member 242 and the insulating member 241 may be connected to each other through the connection member 243. In the vertical direction, the connection member 243 may be formed to be thinner than the insertion member 242 and the insulating member 241. Accordingly, a space may be provided between the insertion member 242 and the insulating member 241, and the counterpart connector may be inserted into the corresponding space. The connection member 243, the insertion member 242, and the connection member 243 may be integrally formed.

Figure 7:
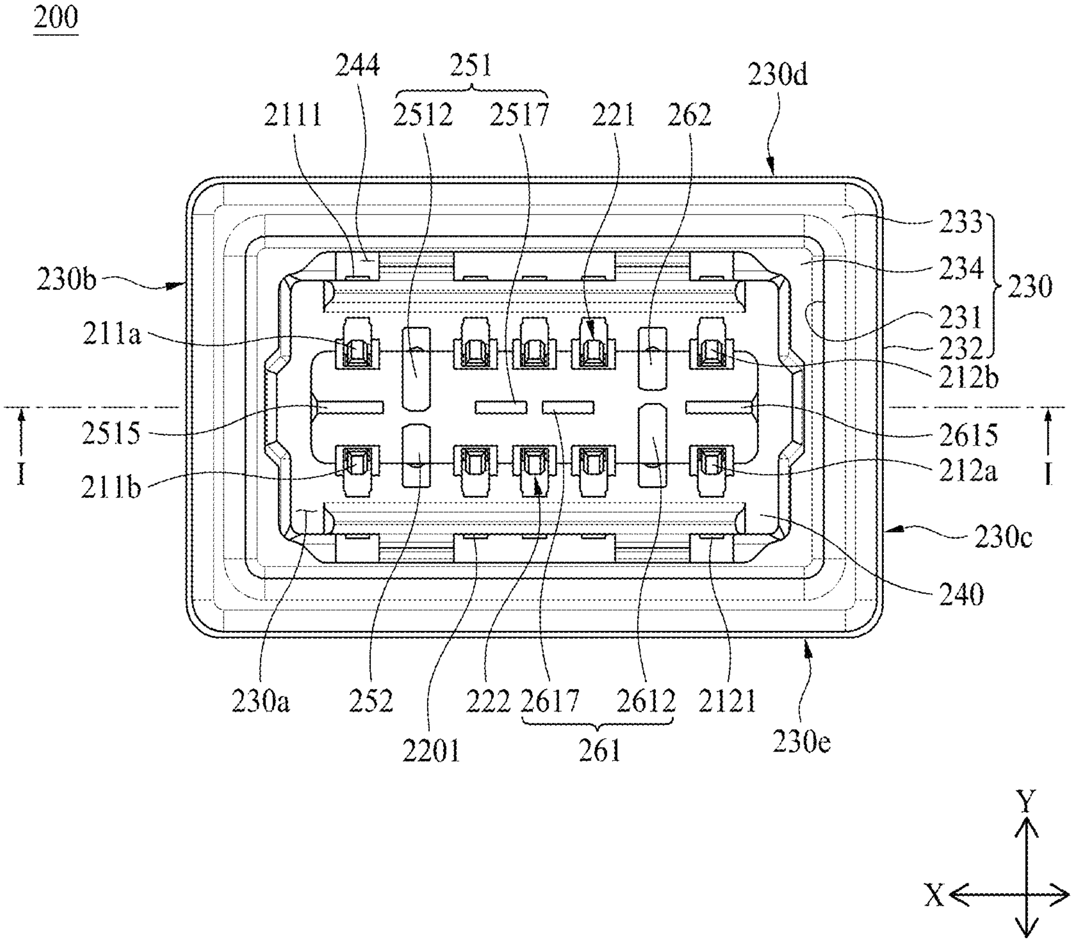
FIG. 7 is a schematic plan view of the board connector according to the first embodiment.

The insulating part 240 may include a soldering inspection window 244 (shown in FIG. 7).

The soldering inspection window 244 may be formed to pass through the insulating part 240. The soldering inspection window 244 may be used to inspect a state in which the RF mounting members 2111 and 2121 are mounted on the first board. In this case, the RF contacts 210 may be coupled to the insulating part 240 such that the RF mounting members 2111 and 2121 are positioned in the soldering inspection window 244. Accordingly, the RF mounting members 2111 and 2121 are not covered by the insulating part 240. Therefore, in a state in which the board connector 200 according to the first embodiment is mounted on the first board, an operator may inspect a state in which the RF mounting members 2111 and 2121 are mounted on the first board through the soldering inspection window 244. Accordingly, in the board connector 200 according to the first embodiment, even when all of the RF contacts 210 including the RF mounting members 2111 and 2121 are positioned inside the ground housing 230, it is possible to improve the accuracy of a mounting operation of mounting the RF contacts 210 on the first board. The soldering inspection window 244 may be formed to pass through the insulating member 241.

The insulating part 240 may include a plurality of soldering inspection windows 244. In this case, the RF mounting members 2111 and 2121 may be positioned in different soldering inspection windows 244. The transmission mounting members 2201 may be positioned in some of the soldering inspection windows 244. Therefore, in a state in which the board connector 200 according to the first embodiment is mounted on the first board, an operator may inspect a state in which the RF mounting members 2111 and 2121 and the transmission mounting members 2201 are mounted on the first board through the soldering inspection windows 244. Accordingly, in the board connector 200 according to the first embodiment, it is possible to improve the accuracy of an operation of mounting the RF mounting members 2111 and 2121 and the transmission mounting members 2201 on the first board. The soldering inspection windows 244 may be formed to pass through the insulating part 240 at positions spaced apart from each other.

Board Connector 300 According to Second Embodiment

Figure 10:
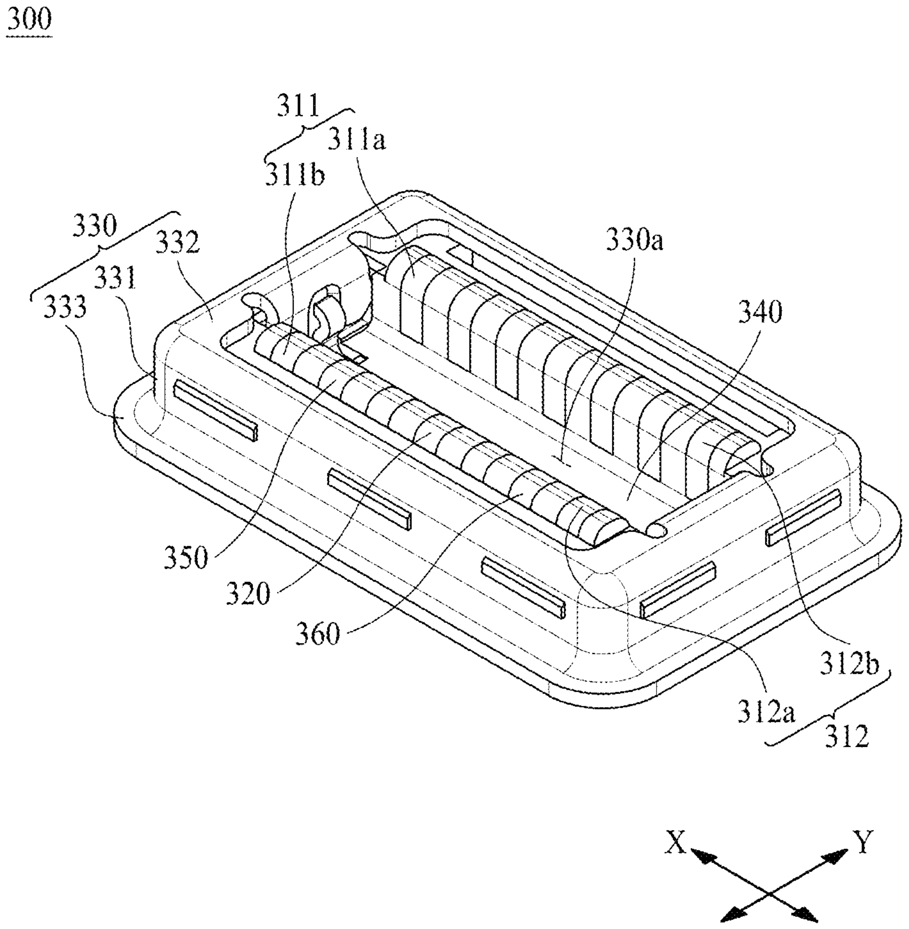
FIG. 10 is a schematic perspective view of the board connector according to the second embodiment.
Figure 11:
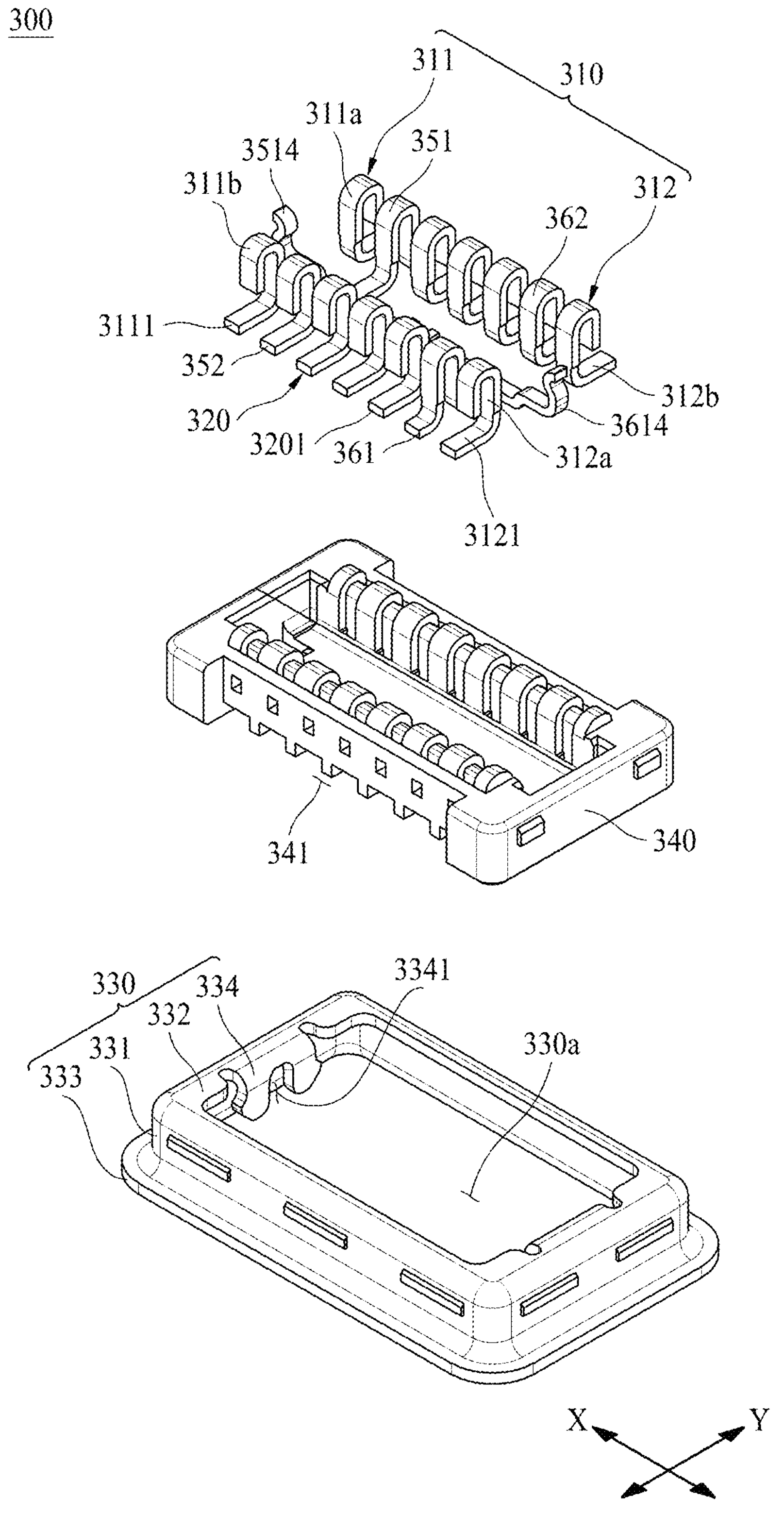
FIG. 11 is a schematic exploded perspective view of the board connector according to the second embodiment.
Figure 12:
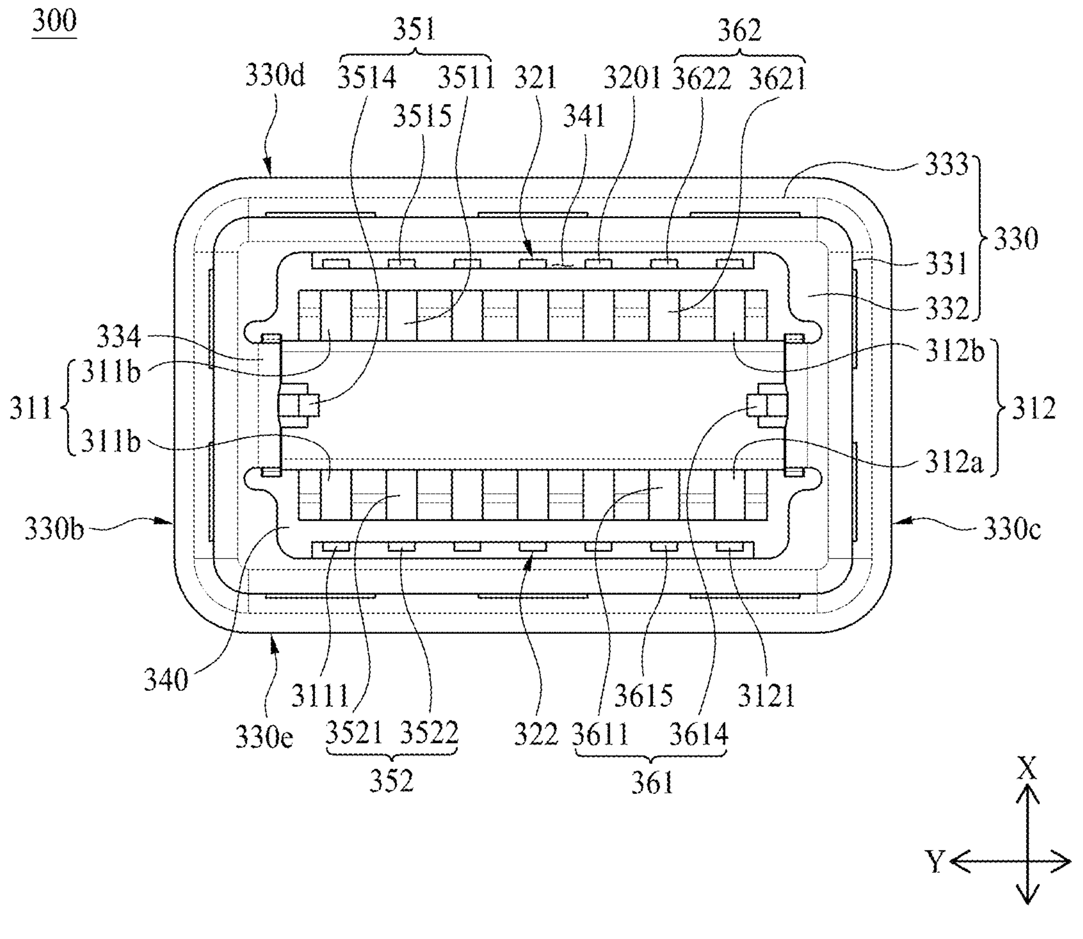
FIG. 12 is a schematic plan view of the board connector according to the second embodiment.

Referring to FIGS. 2, 10, and 11, the board connector 300 according to the second embodiment may be mounted on the second board. When the board connector 300 according to the second embodiment is assembled and coupled to a counterpart connector, the second board on which the board connector 300 according to the second embodiment is mounted may be electrically connected to the first board on which the counterpart connector is mounted. In this case, the counterpart connector may be implemented as the board connector 200 according to the first embodiment. Meanwhile, the counterpart connector in the board connector 200 according to the first embodiment may be implemented as the board connector 300 according to the second embodiment.

The board connector 300 according to the second embodiment may include a plurality of RF contacts 310, a plurality of transmission contacts 320, a ground housing 330, and an insulating part 340. Since the RF contacts 310, the transmission contacts 320, the ground housing 330, and the insulating part 340 are implemented to be substantially identical to the RF contacts 210, the transmission contacts 220, the ground housing 230, and the insulating part 240 in the board connector 200 according to the first embodiment described above, the differences will be mainly described below.

A first RF contact 311 among the RF contacts 310 and a second RF contact 312 among the RF contacts 310 may be supported by the insulating part 340 at positions spaced apart from each other in the first axial direction (X axis direction). The first RF contact 311 may include a first RF mounting member 3111 to be mounted on the second board. The second RF contact 312 may include a second RF mounting member 3121 to be mounted on the second board.

The transmission contacts 320 may be disposed between the first RF contact 311 and the second RF contact 312 in the first axial direction (X-axis direction). First transmission contacts 321 among the transmission contacts 320 and second transmission contacts 322 among the transmission contacts 320 may be spaced apart from each other in the second axial direction (Y-axis direction). The first transmission contacts 321 may be spaced apart from each other in the first axial direction (X-axis direction). The second transmission contacts 322 may be spaced apart from each other in the first axial direction (X-axis direction).

The insulating part 340 is coupled to the ground housing 330. The ground housing 330 may be mounted on the second board to be grounded. The ground housing 330 may be disposed to surround sides of an inner space 330*a*. The insulating part 340 may be positioned in the inner space 330*a*. All of the first RF contact 311, the second RF contact 312, and the transmission contacts 22 may be positioned in the inner space 330*a*. In this case, all of the first RF mounting member 3111, the second RF mounting member 3121, and transmission mounting members 3201 may also be positioned in the inner space 330*a*. The counterpart connector may be inserted into the inner space 330*a*. In this case, a portion of the counterpart connector may be inserted into the inner space 330*a*, and a portion of the board connector 300 according to the second embodiment may be inserted into the inner space of the counterpart connector. The ground housing 330 may be disposed to surround all sides of the inner space 330*a*.

The insulating part 340 supports the RF contacts 310. The RF contacts 310 and the transmission contacts 320 may be coupled to the insulating part 340. The insulating part 340 may be coupled to the ground housing 330 such that the RF contacts 310 and the transmission contacts 320 are positioned in the inner space 330*a*.

Referring to FIGS. 9 to 14, the board connector 300 according to the second embodiment may include a first ground contact 350 and a second ground contact 360. Since the first ground contact 350 and the second ground contact 360 are implemented to be substantially identical to the first ground contact 250 and the second ground contact 260 in the board connector 200 according to the first embodiment described above, the differences will be mainly described below.

The first ground contact 350 may implement a shielding function for the first RF contact 311 together with the ground housing 330. The first ground contact 350 may be disposed between the first RF contact 311 and the transmission contacts 320 in the first axial direction (X-axis direction). When the counterpart connector is inserted into the inner space 330*a*, the first ground contact 350 may be connected to a ground contact of the counterpart connector.

The second ground contact 360 may implement a shielding function for the second RF contact 312 together with the ground housing 330. The second ground contact 360 may be disposed between the transmission contacts 320 and the second RF contact 212 in the first axial direction (X-axis direction). When the counterpart connector is inserted into the inner space 330*a*, the second ground contact 360 may be connected to a ground contact of the counterpart connector.

Here, the board connector 300 according to the second embodiment may be implemented to include a plurality of first RF contacts 311 and a plurality of second RF contacts 312.

Referring to FIGS. 9 to 14, the first RF contacts 311 and the second RF contacts 312 may be spaced apart from each other in the first axial direction (X-axis direction). The transmission contacts 320 may be disposed between the first RF contacts 311 and the second RF contacts 312 in the first axial direction (X-axis direction). In this case, the first ground contact 350 may shield the first RF contacts 311 from the transmission contacts 320 in the first axial direction (X-axis direction). The second ground contact 260 may shield the second RF contacts 312 from the transmission contacts 320 in the first axial direction (X-axis direction).

Figure 13:
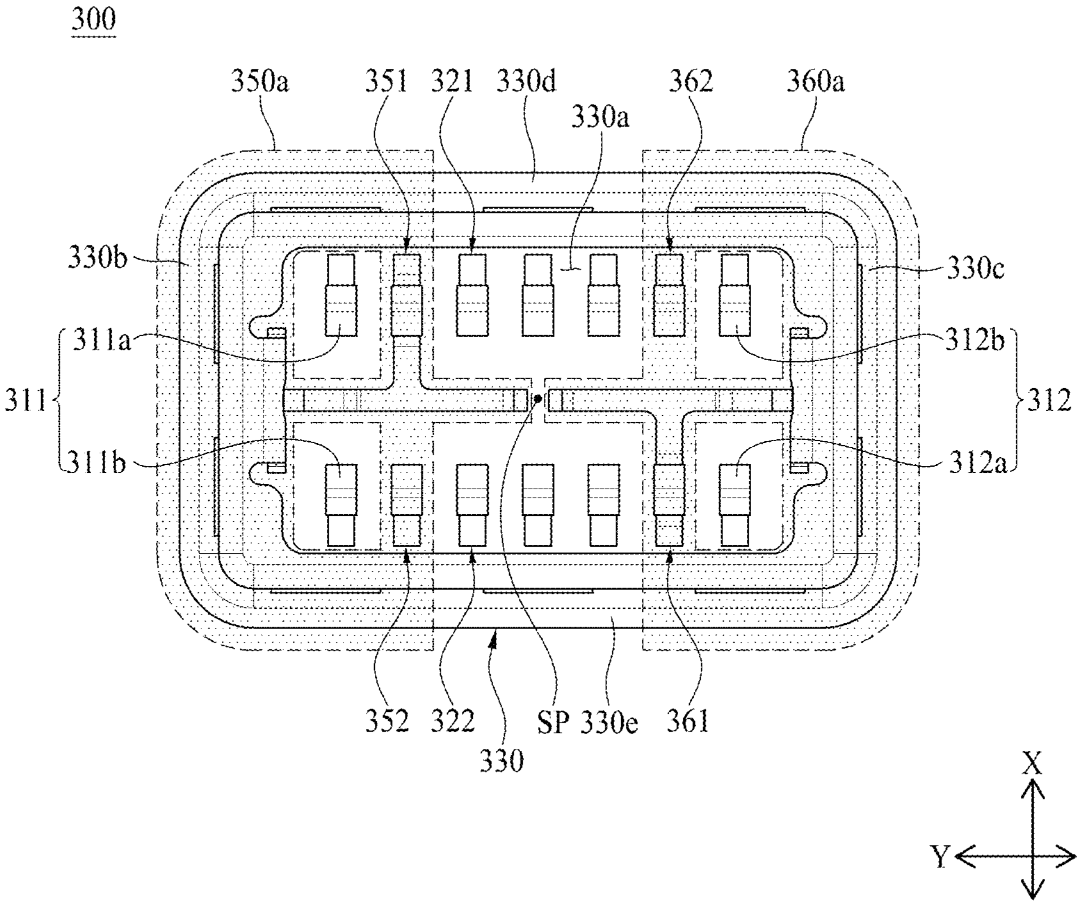
FIG. 13 is a conceptual plan view for describing a ground loop in the board connector according to the second embodiment.
Figure 14:
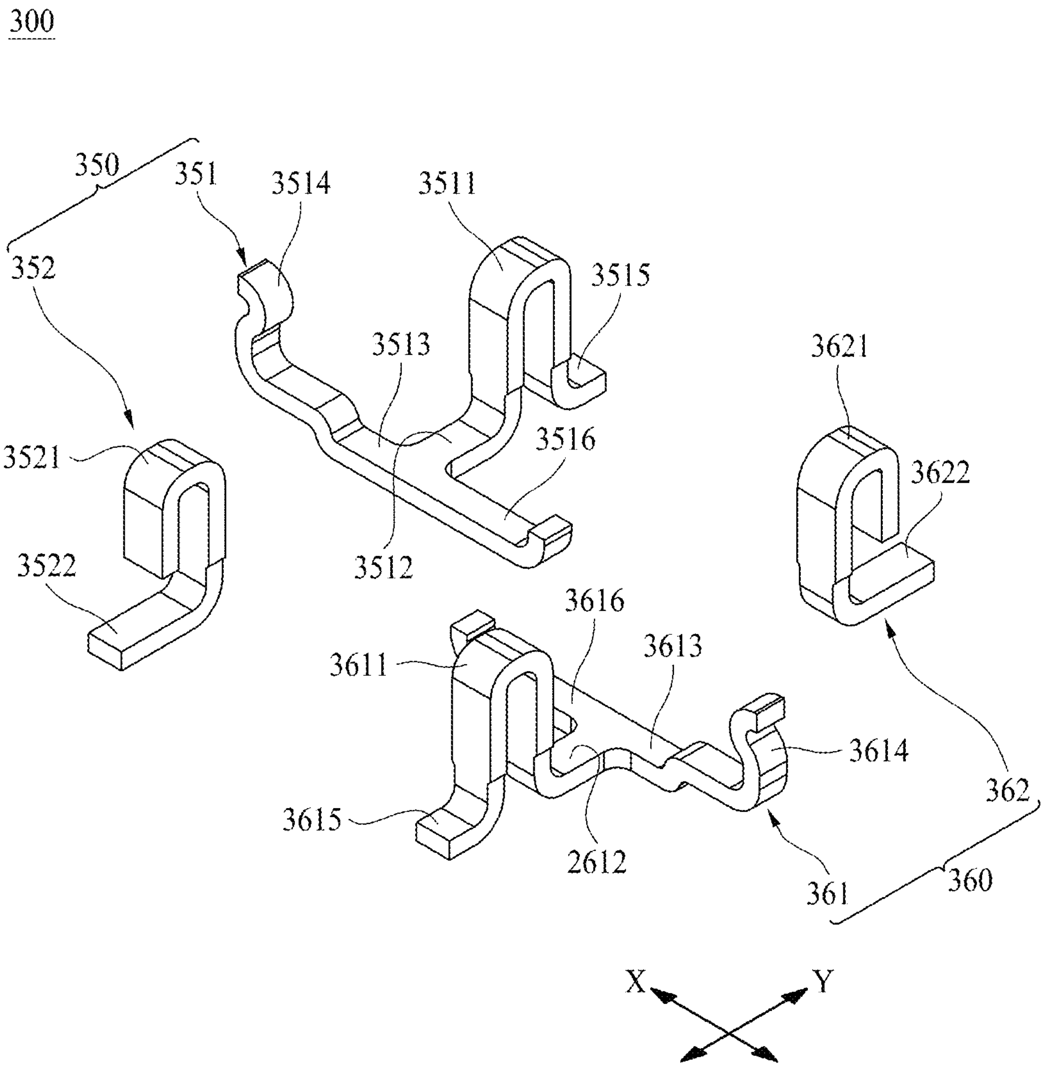
FIG. 14 shows schematic perspective views of a first ground contact and a second ground contact in the board connector according to the second embodiment.
Figure 15:
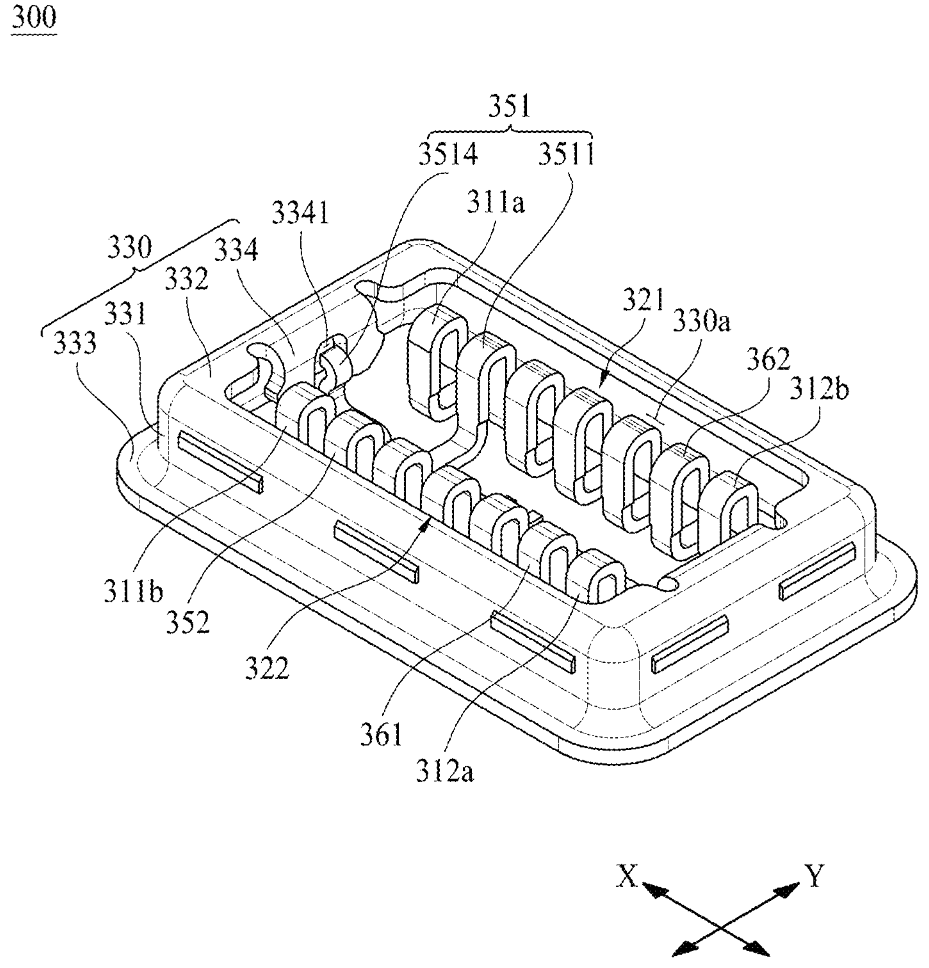
FIG. 15 is a schematic perspective view illustrating a state in which contacts are disposed in a ground housing in the board connector according to the second embodiment.

A 1-1 RF contact 311*a* among the first RF contacts 311 and a 1-2 RF contact 311*b* among the first RF contacts 311 may be coupled to the insulating part 240 to be spaced apart from each other in the second axial direction (Y-axis direction). Although the board connector 300 according to the second embodiment is illustrated in FIG. 13 as including two first RF contacts 311 implemented as the 1-1 RF contact 311*a* and the 1-2 RF contact 311*b*, the present disclosure is not limited thereto, and the board connector 300 according to the second embodiment may include three or more first RF contacts 311. Meanwhile, in the present specification, description will be provided based on the board connector 300 according to the second embodiment including the 1-1 RF contact 311*a* and the 1-2 RF contact 311*b*.

When the 1-1 RF contact 311*a* and the 1-2 RF contact 311*b* are provided, the first ground contact 350 may include the 1-1 ground contact 351.

The 1-1 ground contact 351 may not only shield the 1-1 RF contact 311*a* from the transmission contacts 320 in the first axial direction (X-axis direction) but may also shield the 1-1 RF contact 311*a* from the 1-1 RF contact 311*b* in the second axial direction (Y-axis direction) by being connected to the ground contact of the counterpart connector.

Accordingly, in the board connector 300 according to the second embodiment, even when the 1-1 RF contact 311*a* and the 1-2 RF contact 311*b* transmit different RF signals, it is possible to prevent signal interference or the like between the 1-1 RF contact 311*a* and the 1-2 RF contact 311*b* using the 1-1 ground contact 351. Therefore, the board connector 300 according to the second embodiment is implemented to stably transmit a wider variety of RF signals using the 1-1 RF contact 311*a* and the 1-2 RF contact 311*b*.

A portion of the 1-1 ground contact 351 may be positioned between the 1-1 RF contact 311*a* and the transmission contacts 320 in the first axial direction (X-axis direction). In this case, a portion of the 1-1 ground contact 351 may be positioned between the 1-1 RF contact 311*a* and the first transmission contacts 321 in the first axial direction (X-axis direction). A portion of the 1-1 ground contact 351 may be disposed between the 1-1 RF contact 311*a* and the 1-2 RF contact 311*b* in the second axial direction (Y-axis direction).

The 1-1 ground contact 351 may include a 1-1 ground connection member 3511 and a 1-1 ground mounting member 3512.

The 1-1 ground connection member 3511 is to be connected to the ground contact of the counterpart connector. The first ground contact 350 may be connected to the ground contact of the counterpart connector through the 1-1 ground connection member 3511 to be electrically connected to the ground contact of the counterpart connector. Accordingly, it is possible to strengthen shielding power of the first ground contact 350 with respect to the first RF contacts 311. For example, the 1-1 ground connection member 3511 is to be connected to the 1-1 ground connection member 2512 of the 1-1 ground contact 251 of the board connector 200 according to the first embodiment.

The 1-1 ground connection member 3511 may be positioned between the 1-1 RF contact 311*a* and the transmission contacts 320 in the first axial direction (X-axis direction). Accordingly, the 1-1 ground connection member 3511 may shield the 1-1 RF contact 311*a* from the transmission contacts 320 in the first axial direction (X-axis direction). In this case, the 1-1 ground connection member 3511 may be positioned between the 1-1 RF contact 311*a* and the first transmission contacts 321 in the first axial direction (X-axis direction). The 1-1 ground connection member 3511 may be formed in a plate shape disposed in the vertical direction. In this case, the 1-1 ground connection member 3511 may be implemented to be disposed in the vertical direction through bending of a plate material.

The 1-1 ground mounting member 3512 is mounted on the second board. The 1-1 ground mounting member 3512 may be mounted on the second board to be grounded. Accordingly, the 1-1 ground contact 351 may be grounded to the second board through the 1-1 ground mounting member 3512. The 1-1 ground mounting member 3512 may protrude from the 1-1 ground connection member 3511 in the second axial direction (Y-axis direction). The 1-1 ground mounting member 3512 may be formed in a plate shape disposed in the horizontal direction.

The 1-1 ground contact 351 may include the 1-1 ground coupling member 3513.

The 1-1 ground coupling member 3513 is coupled to the 1-1 ground mounting member 3512. The 1-1 ground coupling member 3513 may protrude from the 1-1 ground mounting member 3512 in the first axial direction (X-axis direction). The 1-1 ground coupling member 3513 may be positioned between the 1-1 RF contact 311*a* and the 1-2 RF contact 311*b* in the second axial direction (Y-axis direction). Accordingly, the 1-1 ground contact 351 may shield the 1-1 RF contact 311*a* from the 1-2 RF contact 311*b* using the 1-1 ground coupling member 3513. Therefore, the 1-1 ground contact 351 may prevent signal interference or the like between the 1-1 RF contact 311*a* and the 1-2 RF contact 311*b* using the 1-1 ground coupling member 3513. The 1-1 ground coupling member 3513 may be formed in a plate shape disposed in the horizontal direction.

The 1-1 ground coupling member 3513 may be spaced the same distance from the 1-1 RF contact 311*a* and the 1-2 RF contact 311*b* in the second axial direction (Y-axis direction). Accordingly, in the board connector 300 according to the second embodiment, it is possible to reduce a deviation between shielding performance for the 1-1 RF contact 311*a* and shielding performance for the 1-2 RF contact 311*b*. Therefore, in the board connector 300 according to the second embodiment, a shielding function can be stably implemented for each of the 1-1 RF contact 311*a* and the 1-2 RF contact 311*b* using the 1-1 ground coupling member 3513.

The 1-1 ground coupling member 3513 may be mounted on the second board. The ground contact of the counterpart connector may be connected to the 1-1 ground coupling member 3513. For example, the 1-1 connection protruding member 2515 of the 1-1 ground contact 251 of the board connector 200 according to the first embodiment may be connected to the 1-1 ground coupling member 3513.

The 1-1 ground contact 351 may include a 1-1 connection arm 3514.

The 1-1 connection arm 3514 is to be connected to the ground contact of the counterpart connector. The 1-1 connection arm 3514 may be connected to the ground contact of the counterpart to move elastically. Accordingly, connection of the 1-1 ground contact 351 to the ground contact of the counterpart connector can be firmly maintained using an elastic force or restoring force of the 1-1 connection arm 3514, thereby improving the stability of the connection with the ground contact of the counterpart connector. Therefore, in the board connector 300 according to the second embodiment, a connection force with the ground contact of the counterpart connector can be strengthened using the 1-1 connection arm 3514, thereby further strengthening shielding performance through the connection with the ground contact of the counterpart connector. For example, as shown in FIG. 8, the 1-1 connection arm 3514 may be connected to the 1-1 shielding member 2511 of the 1-1 ground contact 251 of the board connector 200 according to the first embodiment. In this case, the 1-1 connection arm 3514 may be pushed by the 1-1 shielding member 2511 and move elastically to press the 1-1 shielding member 2511 using a restoring force.

The 1-1 connection arm 3514 may be elastically and movably coupled to the 1-1 ground coupling member 3513. When the 1-1 connection arm 3514 is connected to the ground contact of the counterpart connector, the 1-1 connection arm 3514 may be rotated about a portion thereof coupled to the 1-1 ground coupling member 3513. The 1-1 connection arm 3514 may be formed in a plate shape disposed in the vertical direction. In this case, the 1-1 ground connection member 2512 may be implemented to be disposed in the vertical direction by bending a plate material.

The 1-1 ground contact 351 may include a 1-1 ground protrusion 3515.

The 1-1 ground protrusion 3515 is mounted on the second board. The 1-1 ground protrusion 3515 may protrude from the 1-1 ground connection member 3511. In this case, the 1-1 ground connection member 3511 may be coupled to each of the 1-1 ground protrusion 3515 and the 1-1 ground mounting member 3512. Accordingly, the 1-1 ground protrusion 3515 and the 1-1 ground mounting member 3512 may be mounted on the second board at different positions. Accordingly, in the board connector 300 according to the second embodiment, it is possible to increase a mounting area in which the 1-1 ground contact 351 is mounted on the second board, thereby further strengthening shielding performance using the 1-1 ground contact 351. The 1-1 ground protrusion 3515 and the 1-1 ground mounting member 3512 may protrude from the 1-1 ground connection member 3511 in opposite directions in the second axial direction (Y-axis direction). The 1-1 ground protrusion 3515 may be formed in a plate shape disposed in the horizontal direction.

The 1-1 ground contact 351 may include a 1-1 transmission shielding member 3516.

The 1-1 transmission shielding member 3516 is positioned between the first transmission contacts 321 and the second transmission contacts 322 in the second axial direction (Y-axis direction). The 1-1 transmission shielding member 3516 may shield the first transmission contacts 321 from the second transmission contacts 322 in the second axial direction (Y-axis direction). Accordingly, the 1-1 ground contact 351 can prevent signal interference or the like between the first transmission contacts 321 and the second transmission contacts 322 using the 1-1 transmission shielding member 3516. Accordingly, the board connector 300 according to the second embodiment may transmit a wider variety of signals, data, power, and the like using the first transmission contacts 321 and the second transmission contacts 322, thereby improving versatility and making it applicable to a wider variety of electronic products. The 1-1 transmission shielding member 3516 may be formed in a plate shape disposed in the horizontal direction between the first transmission contacts 321 and the second transmission contacts 22.

The 1-1 transmission shielding member 3516 may be spaced the same distance from the first transmission contacts 321 and the second transmission contacts 322 in the second axial direction (Y-axis direction). Accordingly, in the board connector 300 according to the second embodiment, it is possible to reduce a deviation between shielding performance for the first transmission contacts 321 and shielding performance for the second transmission contacts 322.

The 1-1 transmission shielding member 3516 and the 1-1 ground coupling member 3513 may protrude from the 1-1 ground mounting member 3512 in opposite directions in the first axial direction (X-axis direction). In this case, the 1-1 transmission shielding member 3516 and the 1-1 ground coupling member 3513 may be disposed to be collinear with each other. Accordingly, in the board connector 300 according to the second embodiment, a shielding function for the first RF contacts 311 and a shielding function for the transmission contacts 320 can be implemented using the 1-1 transmission shielding member 3516 and the 1-1 ground coupling member 3513, and also, miniaturization can be implemented by reducing an overall size in the second axial direction (Y-axis direction).

The 1-1 transmission shielding member 3516 may be mounted on the second board. The ground contact of the counterpart connector may be connected to the 1-1 transmission shielding member 3516. For example, the upper portion of the 1-1 transmission shielding member 2517 of the 1-1 ground contact 251 of the board connector 200 according to the first embodiment may be connected to the 1-1 transmission shielding member 3516.

The first ground contact 350 may include a 1-2 ground contact 352.

The 1-2 ground contact 352 may be positioned between the 1-2 RF contact **311*b* and the transmission contacts 320 in the first axial direction (X-axis direction). Accordingly, the 1-2 ground contact 352 may shield the 1-2 RF contact 311*b* from the transmission contacts 320. The 1-2 ground contact 352 may be spaced apart from the 1-1 ground contact 351 in the second axial direction (Y-axis direction). The 1-2 ground contact 352 and the 1-1 ground contact 351 may be formed in different shapes. For example, the 1-2 ground contact 352 may be formed in a shape not including the 1-1 ground coupling member 3513, the 1-1 connection arm 3514, the 1-1 ground protrusion 3515, and the 1-1 transmission shielding member 3516 of the 1-1 ground contact 351. Accordingly, in the board connector 300 according to the second embodiment, as compared with an embodiment in which the 1-2 ground contact 352 is formed in the same shape as the 1-1 ground contact 351, it is possible to not only improve the easiness of a manufacturing operation of manufacturing the 1-2 ground contact 352 but also reduce material costs for manufacturing the 1-2 ground contact 352. In this case, the shielding between the 1-1 RF contact 311*a* and the 1-2 RF contact 311*b* may be performed by the 1-1 ground contact 351**.

The 1-2 ground contact 352 may include a 1-2 ground connection member 3521 and a 1-2 ground mounting member 3522.

The 1-2 ground connection member 3521 is to be connected to the ground contact of the counterpart connector. The first ground contact 350 may be connected to the ground contact of the counterpart connector through the 1-2 ground connection member 3521 to be electrically connected to the ground contact of the counterpart connector. Accordingly, a gap generated due to the 1-2 ground contact 352 and the 1-1 ground contact 351 being spaced apart from each other in the second axial direction (Y-axis direction) can be shielded by the first ground contact 350 being connected to the ground contact of the counterpart connector through the 1-2 ground connection member 3521. In this case, both the 1-2 ground connection member 3521 and the 1-1 ground connection member 3511 may be connected to the ground contact of the counterpart connector.

The 1-2 ground mounting member 3522 is mounted on the second board. The 1-2 ground mounting member 3522 may be mounted on the second board to be grounded. Accordingly, the 1-2 ground contact 352 may be grounded to the second board through the 1-2 ground mounting member 3522. The 1-2 ground mounting member 3522 may protrude from the 1-2 ground connection member 3521 in the second axial direction (Y-axis direction). In this case, the 1-2 ground mounting member 3522 may be disposed between the 1-2 RF contact **311*b* and the second transmission contacts 322 in the first axial direction (X-axis direction). Accordingly, the 1-2 ground mounting member 3522** may shield the 1-2 RF contact 311*b* from the second transmission contacts 322. The 1-2 ground mounting member 3522 may be formed in a plate shape disposed in the horizontal direction.

As described above, in the board connector 300 according to the second embodiment, a first ground loop 350*a* (shown in FIG. 5) for the 1-1 RF contact 311*a* and the 1-2 RF contact 311*b* may be implemented using the 1-1 ground contact 351, the 1-2 ground contact 352, and the ground housing 330. Accordingly, in the board connector 300 according to the second embodiment, shielding performance for the 1-1 RF contact 311*a* and the 1-2 RF contact 311*b* is further strengthened using the first ground loop 350*a*, thereby implementing complete shielding for the 1-1 RF contact 311*a* and the 1-2 RF contact 311*b*.

Referring to FIGS. 9 to 14, when the plurality of second RF contacts 312 are provided, the second ground contact 360 may not only shield the second RF contacts 312 from the transmission contacts 320 in the first axial direction (X-axis direction) but may also shield the second RF contacts 312 from each other in the second axial direction (Y-axis direction). Accordingly, in the board connector 300 according to the first embodiment, by using the second ground contact 360, it is possible to not only implement a shielding function between the second RF contacts 312 and the transmission contacts 320 but also additionally implement a shielding function between the second RF contacts 312. Therefore, the board connector 300 according to the second embodiment may be implemented to transmit a wider variety of RF signals using the second RF contacts 312, thereby improving versatility and making it applicable to a wider variety of electronic products.

A 2-1 RF contact 312*a* among the second RF contacts 312 and a 2-2 RF contact 312*b* among the second RF contacts 312 may be spaced apart from each other in the second axial direction (Y-axis direction). Although the board connector 300 according to the second embodiment is illustrated in FIG. 13 as including two second RF contacts 312 implemented as the 2-1 RF contact 312*a* and the 2-2 RF contact 312*b*, the present disclosure is not limited thereto, and the board connector 300 according to the second embodiment may include three or more second RF contacts 312. Meanwhile, in the present specification, description will be provided based on the board connector 300 according to the second embodiment including the 2-1 RF contact 312*a* and the 2-2 RF contact 312*b*.

When the 2-1 RF contact 312*a* and the 2-2 RF contact 312*b* are provided, the second ground contact 360 may include a 2-1 ground contact 361.

The 2-1 ground contact 361 may not only shield the 2-1 RF contact 312*a* from the transmission contacts 320 in the first axial direction (X-axis direction) but may also shield the 2-1 RF contact 312*a* from the 2-2 RF contact 312*b* in the second axial direction (Y-axis direction). Accordingly, the board connector 300 according to the second embodiment may be implemented to transmit a wider variety of RF signals using the second RF contacts 312, thereby improving versatility and making it applicable to a wider variety of electronic products.

A portion of the 2-1 ground contact 361 may be positioned between the 2-1 RF contact 312*a* and the second transmission contacts 322 in the first axial direction (X-axis direction) to implement shielding power. In this case, the second transmission contacts 322 may be disposed between the 1-2 RF contact 211*b* and the 2-1 RF contact 312*a* in the first axial direction (X-axis direction). A portion of the 2-1 ground contact 361 may be disposed between the 2-1 RF contact 312*a* and the 2-2 RF contact 312*b* in the second axial direction (Y-axis direction). In this case, the 2-2 RF contact 312*b* may be spaced apart from the 1-1 RF contact 211*a* in the first axial direction (X-axis direction).

The 2-1 ground contact 361 may include at least one of a 2-1 ground connection member 3611, a 2-1 ground mounting member 3612, a 2-1 ground coupling member 3613, a 2-1 connection arm 3614, a 2-1 ground protrusion 3615, and a 2-1 transmission shielding member 3616. In this case, since the 2-1 ground connection member 3611, the 2-1 ground mounting member 3612, the 2-1 ground coupling member 3613, the 2-1 connection arm 3614, the 2-1 ground protrusion 3615, and the 2-1 transmission shielding member 3616 may be implemented to be substantially identical to the 1-1 ground connection member 3511, the 1-1 ground mounting member 3512, the 1-1 ground coupling member 3513, the 1-1 connection arm 3514, and the 1-1 ground protrusion 3515, and the 1-1 transmission shielding member 3516, respectively, detailed description thereof will be omitted.

The 2-1 ground contact 361 and the 1-1 ground contact 351 may be formed in the same shape. Accordingly, in the board connector 300 according to the second embodiment, it is possible to improve the easiness of a manufacturing operation of manufacturing each of the 2-1 ground contact 361 and the 1-1 ground contact 351. In this case, as shown in FIG. 13, the 2-1 ground contact 361 and the 1-1 ground contact 351 may be disposed to be point-symmetrical with respect to a point of symmetry SP. The point of symmetry SP is a point that is spaced the same distance from both sidewalls 330*b* and 330*c* of the ground housing 330 spaced apart from each other in the first axial direction (X-axis direction) and that is also spaced the same distance from both sidewalls 330*d* and 330*e* of the ground housing 330 spaced apart from each other in the second axial direction (Y-axis direction). Accordingly, in the board connector 300 according to the second embodiment, since the 2-1 ground contact 361 and the 1-1 ground contact 351 are formed in the same shape and differ only in arrangement direction, it is possible to further improve the easiness of a manufacturing operation of manufacturing the 2-1 ground contact 361 and the 1-1 ground contact 351. In this case, the 2-1 RF contact 312*a* and the 1-1 RF contact 311*a* may be disposed to be point-symmetrical with respect to the point of symmetry SP. The 2-2 RF contact 312*b* and the 1-2 RF contact 311*b* may be disposed to be point-symmetrical with respect to the point of symmetry SP.

Meanwhile, the 2-1 ground coupling member 2613, the 2-1 transmission shielding member 3616, the 1-1 ground coupling member 3513, and the 1-1 transmission shielding member 3516 may be disposed to be collinear with each other. Accordingly, in the board connector 300 according to the second embodiment, it is possible to not only implement shielding power between the second RF contacts 312, shielding power between the first RF contacts 311, and shielding power between the first transmission contacts 321 and the second transmission contacts 322 but also implement miniaturization by reducing an overall size in the second axial direction (Y-axis direction). The 2-1 transmission shielding member 3616 and the 1-1 transmission shielding member 3516 may be spaced apart from each other in the first axial direction (X-axis direction).

The second ground contact 360 may include a 2-2 ground contact 362.

The 2-2 ground contact 362 may be positioned between the 2-2 RF contact 312*b* and the transmission contacts 320 in the first axial direction (X-axis direction). The 2-2 ground contact 362 may shield the 2-2 RF contact 312*b* from the transmission contacts 320. In this case, the 2-2 ground contact 362 may be disposed between the 2-2 RF contact 312*b* and the first transmission contacts 321. The 2-2 ground contact 362 may be spaced apart from the 2-1 ground contact 361 in the second axial direction (Y-axis direction).

The 2-2 ground contact 362 may include a 2-2 ground connection member 3621 and a 2-2 ground mounting member 3622. In this case, since the 2-2 ground connection member 3621 and the 2-2 ground mounting member 3622 may be implemented to be substantially identical to the 1-1 ground connection member 2521 and the 1-2 ground mounting member 3522, respectively, detailed description thereof will be omitted.

The 2-2 ground contact 362 and the 1-2 ground contact 352 may be formed in the same shape. Accordingly, in the board connector 300 according to the second embodiment, it is possible to improve the easiness of a manufacturing operation of manufacturing each of the 2-2 ground contact 362 and the 1-2 ground contact 352. In this case, as shown in FIG. 5, the 2-2 ground contact 362 and the 1-2 ground contact 352 may be disposed to be point-symmetrical with respect to the point of symmetry SP. Accordingly, in the board connector 300 according to the second embodiment, since the 2-2 ground contact 362 and the 1-2 ground contact 352 are formed in the same shape and differ only in arrangement direction, it is possible to further improve the easiness of a manufacturing operation of manufacturing the 2-2 ground contact 362 and the 1-2 ground contact 352.

Referring to FIGS. 9 to 15, in the board connector 300 according to the second embodiment, the ground housing 330 may be implemented as follows.

The ground housing 330 may include a ground sidewall 331, a ground upper wall 332, and a ground lower wall 333.

The ground sidewall 331 faces the insulating part 240. The ground sidewall 331 may be disposed to face the inner space 330*a*. The ground sidewall 331 may be disposed to surround all sides of the inner space 330*a*.

The ground sidewall 331 may be connected to the ground housing of the counterpart connector inserted into the inner space 330*a*. For example, as shown in FIG. 9, the ground sidewall 331 may be connected to the ground inner wall 231 of the ground housing 230 of the board connector 200 according to the first embodiment. As described above, in the board connector 300 according to the second embodiment, a shielding function can be further strengthened through the connection between the ground housing 330 and the ground housing of the counterpart connector. In addition, in the board connector 300 according to the second embodiment, through the connection between the ground housing 330 and the ground housing of the counterpart connector, it is possible to reduce adverse electrical effects such as crosstalk, which may be caused by capacitance or induction between adjacent terminals. In this case, in the board connector 300 according to the second embodiment, it is possible to secure a path through which electromagnetic waves are introduced into at least one ground of the second board and the first board, thereby further strengthening EMI shielding performance.

The ground upper wall 332 is coupled to the ground sidewall 331. The ground upper wall 332 may be coupled to one end of the ground sidewall 331. The ground upper wall 332 may protrude from the ground sidewall 331 toward the inner space 330*a*. The ground upper wall 332 may be connected to the ground housing of the counterpart connector inserted into the inner space 330*a*. Accordingly, in the board connector 300 according to the second embodiment, the ground upper wall 332 and the ground sidewall 331 are connected to the ground housing of the counterpart connector to increase a contact area between the ground housing 330 and the ground housing of the counterpart connector, thereby further strengthening a shielding function. For example, as shown in FIG. 9, the ground upper wall 332 may be connected to the ground floor 234 of the ground housing 230 of the board connector 200 according to the first embodiment.

The ground lower wall 333 is coupled to the ground sidewall 331. The ground lower wall 333 may be coupled to the other end of the ground sidewall 331. The ground lower wall 333 may protrude from the ground sidewall 331 to a side opposite to the inner space 330*a*. The ground lower wall 333 may be disposed to surround all sides of the ground sidewall 331. The ground lower wall 333 and the ground sidewall 331 may be implemented as shielding walls surrounding the sides of the inner space 330*a*. The first RF contacts 311 and the second RF contacts 312 may be positioned in the inner space 330*a* surrounded by the shielding wall. Accordingly, the ground housing 330 may implement a shielding function for the RF contacts 310 using the shielding wall. Accordingly, the board connector 300 according to the second embodiment may contribute to further improving EMI shielding performance and EMC performance using the shielding wall. The ground lower wall 333 may be mounted on the second board to be grounded. In this case, the ground housing 330 may be grounded through the ground lower wall 333.

The ground lower wall 333 and the ground upper wall 332 may be formed in a plate shape disposed in the horizontal direction, and the ground sidewall 331 may be formed in a plate shape disposed in the vertical direction. The ground lower wall 333, the ground upper wall 332, and the ground sidewall 331 may be integrally formed.

Here, the ground housing 330 may implement a shielding function for the first RF contacts 311 together with the first ground contact 350. The ground housing 330 may implement a shielding function for the second RF contacts 312 together with the second ground contact 360.

In this case, as shown in FIG. 13, the ground housing 330 may include a first shielding wall 330*b*, a second shielding wall 330*c*, a third shielding wall 330*d*, and a fourth shielding wall 330*e*. Each of the first shielding wall 330*b*, the second shielding wall 330*c*, the third shielding wall 330*d*, and the fourth shielding wall 330*e* may be implemented by the ground sidewall 331, the ground lower wall 333, and the ground upper wall 332. The first shielding wall 330*b* and the second shielding wall 330*c* are disposed to face each other in the first axial direction (X-axis direction). The first RF contacts 311 and the second RF contacts 312 may be positioned between the first shielding wall 330*b* and the second shielding wall 330*c* in the first axial direction (X-axis direction). The first RF contacts 311 may be positioned at a position where a separation distance from the first shielding wall 330*b* is shorter than a separation distance from the second shielding wall 330*c* in the first axial direction (X-axis direction). The second RF contacts 312 may be positioned at a position where a separation distance from the second shielding wall 330*c* is shorter than a separation distance from the first shielding wall 330*b* in the first axial direction (X-axis direction). The third shielding wall 330*d* and the fourth shielding wall 330*e* are disposed to face each other in the second axial direction (Y-axis direction). The first RF contacts 311 and the second RF contacts 312 may be positioned between the third shielding wall 330*d* and the fourth shielding wall 330*e* in the second axial direction (Y-axis direction).

The first ground contact 350 may be disposed between the first RF contacts 311 and the transmission contacts 320 in the first axial direction (X-axis direction). Accordingly, the first RF contacts 311 may be positioned between the first shielding wall 330_b_ and the first ground contact 350 in the first axial direction (X-axis direction) and may be positioned between the third shielding wall 330_d_ and the fourth shielding wall 330_e_ in the second axial direction (Y-axis direction). Therefore, in the board connector 300 according to the second embodiment, a shielding function for the first RF contacts 311 can be strengthened using the first ground contact 350, the first shielding wall 330_b_, the third shielding wall 330_d_, and the fourth shielding wall 330_e_. The first ground contact 350, the first shielding wall 330_b_, the third shielding wall 330_d_, and the fourth shielding wall 330_e_ are disposed at four sides of the first RF contacts 311 to implement shielding power from RF signals. In this case, the first ground contact 350, the first shielding wall 330_b_, the third shielding wall 330_d_, and the fourth shielding wall 330_e_ may implement the first ground loop 350_a_ (shown in FIG. 5) for the first RF contacts 311. Accordingly, in the board connector 300 according to the second embodiment, a shielding function for the first RF contacts 311 is further strengthened using the first ground loop 350_a_, thereby implementing complete shielding for the first RF contacts 311.

The second ground contact 360 may be disposed between the second RF contacts 312 and the transmission contacts 320 in the first axial direction (X-axis direction). Accordingly, the second RF contacts 312 may be positioned between the second shielding wall 330_c_ and the second ground contact 360 in the first axial direction (X-axis direction) and may be positioned between the third shielding wall 330_d_ and the fourth shielding wall 330_e_ in the second axial direction (Y-axis direction). Therefore, in the board connector 300 according to the second embodiment, a shielding function for the second RF contacts 312 can be strengthened using the second ground contact 360, the second shielding wall 330_c_, the third shielding wall 330_d_, and the fourth shielding wall 330_e_. The second ground contact 360, the second shielding wall 330_c_, the third shielding wall 330_d_, and the fourth shielding wall 330_e_ are disposed at four sides of the second RF contacts 312 to implement shielding power from RF signals. In this case, the second ground contact 360, the second shielding wall 330_c_, the third shielding wall 330_d_, and the fourth shielding wall 330_e_ may implement a second ground loop 360_a_ (shown in FIG. 5) for the second RF contacts 312. Accordingly, in the board connector 300 according to the second embodiment, a shielding function for the second RF contacts 312 is further strengthened using the second ground loop 360_a_, thereby implementing complete shielding for the second RF contacts 312.

Referring to FIGS. 9 to 15, the ground housing 330 may include a ground protection wall 334.

The ground protection wall 334 is for protecting the 1-1 connection arm 3514. The ground protection wall 334 may be coupled to the ground upper wall 332. A protection groove 3341 may be formed in the ground protection wall 334. The 1-1 connection arm 3514 may be inserted into the protection groove 3341. Accordingly, the ground protection wall 334 may protect the 1-1 connection arm 3514 inserted into the protection groove 3341 from the outside. When the 1-1 connection arm 3514 is connected to the ground contact of the counterpart connector, the 1-1 connection arm 3514 may move elastically while inserted into the protection groove 3341. Although not shown, the ground protection wall 334 may be connected to the ground housing of the counterpart connector inserted into the inner space 330_a_. The ground protection wall 334 and the ground upper wall 332 may be integrally formed. The ground protection wall 334 may be formed in a plate shape disposed in the vertical direction.

The ground protection wall 334 may be coupled to the ground upper wall 332 to protrude from the first shielding wall 330_b_ toward the inner space 330_a_. The board connector 300 according to the second embodiment may include a plurality of ground protection walls 334. In this case, any one of the ground protection walls 334 may be coupled to the first shielding wall 330_b_ to protect the 1-1 connection arm 3514, and any one of the ground protection walls 334 may be coupled to the second shielding wall 330_c_ to protect the 2-1 connection arm 3614.

Referring to FIGS. 9 to 14, in the board connector 300 according to the second embodiment, the insulating part 340 may include a soldering inspection window 341.

The soldering inspection window 341 may be formed to pass through the insulating part 340. The soldering inspection window 341 may be used to inspect a state in which the RF mounting members 3111 and 3121 are mounted on the second board. In this case, the RF contacts 310 may be coupled to the insulating part 340 such that the RF mounting members 3111 and 3121 are positioned in the soldering inspection window 341. Accordingly, the RF mounting members 3111 and 3121 are not covered by the insulating part 340. Therefore, in a state in which the board connector 300 according to the second embodiment is mounted on the second board, an operator may inspect a state in which the RF mounting members 3111 and 3121 are mounted on the second board through the soldering inspection window 341. Accordingly, in the board connector 300 according to the second embodiment, even when all of the RF contacts 310 including the RF mounting members 3111 and 3121 are positioned inside the ground housing 330, it is possible to improve the accuracy of a mounting operation of mounting the RF contacts 310 on the second board.

The insulating part 340 may include a plurality of soldering inspection windows 341. In this case, the RF mounting members 3111 and 3121 may be positioned in different soldering inspection windows 341. The transmission mounting members 3201 may be positioned in some of the soldering inspection windows 341. Therefore, in a state in which the board connector 300 according to the second embodiment is mounted on the second board, an operator may inspect a state in which the RF mounting members 3111 and 3121 and the transmission mounting members 3201 are mounted on the second board through the soldering inspection windows 341. Accordingly, in the board connector 300 according to the second embodiment, it is possible to improve the accuracy of an operation of mounting the RF mounting members 3111 and 3121 and the transmission mounting members 3201 on the second board. The soldering inspection windows 341 may be formed to pass through the insulating part 340 at positions spaced apart from each other.

It will be apparent to those skilled in the art to which the present disclosure belongs that the present disclosure is not limited to the above-described embodiments or the accompanying drawings, and various substitutions, modifications, and variations can be made without departing from the spirit or scope of the present disclosure.

The invention claimed is:

1. A board connector comprising:

a plurality of radio frequency (RF) contacts configured to transmit RF signals;

an insulating part configured to support the plurality of RF contacts;

a plurality of transmission contacts coupled to the insulating part between a plurality of first RF contacts among the RF contacts and a plurality of second RF contacts among the plurality of RF contacts such that the plurality of first RF contacts and the plurality of second RF contacts are spaced apart from each other in a first axial direction;

a ground housing to which the insulating part is coupled;

a first ground contact coupled to the insulating part and configured to shield the plurality of first RF contacts from the plurality of transmission contacts in the first axial direction; and a second ground contact coupled to the insulating part and configured to shield the plurality of second RF contacts from the plurality of transmission contacts in the first axial direction, wherein:

a 1-1 RF contact among the plurality of first RF contacts and a 1-2 RF contact among the plurality of first RF contacts are spaced apart from each other in a second axial direction perpendicular to the first axial direction; and the first ground contact includes a 1-1 ground contact that shields the 1-1 RF contact from the plurality of transmission contacts in the first axial direction and simultaneously shields the 1-1 RF contact from the 1-2 RF contact in the second axial direction.

2. The board connector of claim 1, wherein the 1-1 ground contact includes:

a 1-1 shielding member positioned between the 1-1 RF contact and the 1-2 RF contact in the second axial direction; and a 1-1 ground mounting member positioned between the 1-1 RF contact and the plurality of transmission contacts in the first axial direction.

3. The board connector of claim 2, wherein:

the 1-1 ground contact includes a 1-1 connection protruding member protruding from the 1-1 shielding member; and the 1-1 connection protruding member is connected to a ground contact of a counterpart connector or a ground housing of the counterpart connector.

4. The board connector of claim 2, wherein:

the 1-1 ground contact includes a 1-1 ground protruding member protruding from the 1-1 shielding member; and the 1-1 ground protruding member is mounted on a board.

5. The board connector of claim 4, wherein the 1-1 ground mounting member and the 1-1 ground protruding member are mounted on the board at different positions.

6. The board connector of claim 1, wherein:

first transmission contacts among the plurality of transmission contacts and second transmission contacts among the plurality of transmission contacts are spaced apart from each other in the second axial direction; and the 1-1 ground contact includes a 1-1 transmission shielding member positioned between the first transmission contacts and the second transmission contacts in the second axial direction.

7. The board connector of claim 6, wherein:

the 1-1 ground contact includes a 1-1 transmission ground protrusion protruding from the 1-1 transmission shielding member; and the 1-1 transmission ground protrusion is mounted on a board.

8. The board connector of claim 6, wherein:

the 1-1 ground contact includes a 1-1 shielding member positioned between the 1-1 RF contact and the 1-2 RF contact in the second axial direction, and a 1-1 ground connection member disposed between the 1-1 shielding member and the 1-1 transmission shielding member in the first axial direction; and the 1-1 shielding member and the 1-1 transmission shielding member protrude in opposite directions from the 1-1 ground connection member in the first axial direction.

9. The board connector of claim 1, wherein:

first transmission contacts among the plurality of transmission contacts and second transmission contacts among the plurality of transmission contacts are spaced apart from each other in the second axial direction;

the 1-1 ground contact includes a 1-1 ground mounting member disposed between the 1-1 RF contact and the first transmission contacts in the first axial direction; and the first ground contact includes a 1-2 ground contact disposed between the 1-2 RF contact and the second transmission contacts in the first axial direction.

10. The board connector of claim 1, wherein:

a 2-1 RF contact among the second plurality of RF contacts and a 2-2 RF contact among the second plurality of RF contacts are spaced apart from each other in the second axial direction; and the second ground contact includes a 2-1 ground contact which not only shields the 2-1 RF contact from the plurality of transmission contacts in the first axial direction but also shields the 2-1 RF contact from the 2-2 RF contact in the second axial direction.

11. The board connector of claim 10, wherein the 1-1 ground contact and the 2-1 ground contact are disposed to be point-symmetrical with respect to a point of symmetry that is spaced the same distance from both sidewalls of the ground housing spaced apart from each other in the first axial direction and is also spaced the same distance from both sidewalls of the ground housing spaced apart from each other in the second axial direction.

12. The board connector of claim 10, wherein:

first transmission contacts among the plurality of transmission contacts and second transmission contacts among the plurality of transmission contacts are spaced apart from each other in the second axial direction;

the 1-1 ground contact includes a 1-1 shielding member positioned between the 1-1 RF contact and the 1-2 RF contact in the second axial direction, and a 1-1 transmission shielding member positioned between the first transmission contacts and the second transmission contacts in the second axial direction;

the 2-1 ground contact includes a 2-1 shielding member positioned between the 2-1 RF contact and the 2-2 RF contact in the second axial direction, and a 2-1 transmission shielding member positioned between the first transmission contacts and the second transmission contacts in the second axial direction; and the 1-1 shielding member, the 1-1 transmission shielding member, the 2-1 shielding member, and the 2-1 transmission shielding member are disposed to be collinear with each other.

13. A board connector comprising:

a plurality of radio frequency (RF) contacts configured to transmit RF signals;

an insulating part configured to support the plurality of RF contacts;

a plurality of transmission contacts coupled to the insulating part between a plurality of first RF contacts among the plurality of RF contacts and a plurality of second RF contacts among the plurality of RF contacts such that the plurality of first RF contacts and the plurality of second RF contacts are spaced apart from each other in a first axial direction;

a ground housing to which the insulating part is coupled;

a first ground contact coupled to the insulating part and configured to shield the first plurality of RF contacts from the plurality of transmission contacts in the first axial direction; and a second ground contact coupled to the insulating part and configured to shield the second plurality of RF contacts from the plurality of transmission contacts in the first axial direction, wherein:

a 1-1 RF contact among the first plurality of RF contacts and a 1-2 RF contact among the plurality of first RF contacts are spaced apart from each other in a second axial direction perpendicular to the first axial direction;

the first ground contact includes a 1-1 ground contact that:

includes a 1-1 connection arm which is connected to a ground contact of a counterpart connector configured to be elastically moved;

shields the 1-1 RF contact from the plurality of transmission contacts in the first axial direction; and shields the 1-1 RF contact from the 1-2 RF contact through the connection of the ground contact of the counterpart connector in the second axial direction.

14. The board connector of claim 13, wherein:

the 1-1 ground contact includes a 1-1 ground connection member to be connected to the ground contact of the counterpart connector, a 1-1 ground mounting member coupled to the 1-1 ground connection member, and a 1-1 ground coupling member coupled to the 1-1 ground mounting member; and the 1-1 connection arm is elastically and movably coupled to the 1-1 ground coupling member.

15. The board connector of claim 13, wherein:

the 1-1 ground contact includes a 1-1 ground connection member to be coupled to the ground contact of the counterpart connector, a 1-1 ground mounting member coupled to the 1-1 ground connection member, and a 1-1 ground protrusion protruding from the 1-1 ground connection member;

the 1-1 ground connection member is coupled to each of the 1-1 ground mounting member and the 1-1 ground protrusion; and the 1-1 ground mounting member and the 1-1 ground protrusion are mounted on a board at different positions.

16. The board connector of claim 13, wherein:

first transmission contacts among the plurality of transmission contacts and second transmission contacts among the plurality of transmission contacts are spaced apart from each other in the second axial direction; and the 1-1 ground contact includes a 1-1 transmission shielding member positioned between the first transmission contacts and the second transmission contacts in the second axial direction.

17. The board connector of claim 16, wherein:

the 1-1 ground contact includes a 1-1 ground coupling member to which the 1-1 connection arm is coupled and a 1-1 ground mounting member to which the 1-1 ground coupling member is coupled; and the 1-1 ground coupling member and the 1-1 transmission shielding member protrude in opposite directions from the 1-1 ground mounting member in the first axial direction.

18. The board connector of claim 13, wherein:

first transmission contacts among the plurality of transmission contacts and second transmission contacts among the plurality of transmission contacts are spaced apart from each other in the second axial direction;

the 1-1 ground contact includes a 1-1 ground connection member disposed between the 1-1 RF contact and the first transmission contacts in the first axial direction; and the first ground contact includes a 1-2 ground contact disposed between the 1-2 RF contact and the second transmission contacts in the first axial direction.

19. The board connector of claim 13, wherein:

a 2-1 RF contact among the second plurality of RF contacts and a 2-2 RF contact among the second plurality of RF contacts are spaced apart from each other in the second axial direction;

the second ground contact includes a 2-1 ground contact which not only shields the 2-1 RF contact from the plurality of transmission contacts in the first axial direction but also shields the 2-1 RF contact from the 2-2 RF contact in the second axial direction; and the 1-1 ground contact and the 2-1 ground contact are disposed to be point-symmetrical with respect to a point of symmetry that is spaced the same distance from both sidewalls of the ground housing spaced apart from each other in the first axial direction and is also spaced the same distance from both sidewalls of the ground housing spaced apart from each other in the second axial direction.

20. The board connector of claim 13, wherein:

the ground housing includes a ground protection wall configured to protect the 1-1 connection arm; and a protection groove into which the 1-1 connection arm is inserted is formed in the ground protection wall.

* * * * *